US008228858B2

(12) United States Patent
Teo et al.

(10) Patent No.: US 8,228,858 B2
(45) Date of Patent: Jul. 24, 2012

(54) METHOD AND SYSTEM FOR GENERATING ANTENNA SELECTION SIGNALS IN WIRELESS NETWORKS

(75) Inventors: Koon Hoo Teo, Lexington, MA (US); Neelesh B. Mehta, Secunderabad (IN); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 476 days.

(21) Appl. No.: 12/495,207

(22) Filed: Jun. 30, 2009

(65) Prior Publication Data

US 2009/0274110 A1     Nov. 5, 2009

Related U.S. Application Data

(63) Continuation of application No. 11/953,452, filed on Dec. 10, 2007.

(51) Int. Cl.
    *H04W 4/00* (2009.01)
(52) U.S. Cl. ........................................ 370/329
(58) Field of Classification Search ............. 370/329, 370/310, 344, 332, 335, 337, 338, 334, 343, 370/350, 208, 471, 512; 455/562, 69, 561, 455/101
    See application file for complete search history.

(56) References Cited

U.S. PATENT DOCUMENTS

| | | | | |
|---|---|---|---|---|
| 5,848,357 | A * | 12/1998 | Dehner et al. | 455/447 |
| 6,600,934 | B1 * | 7/2003 | Yun et al. | 455/562.1 |
| 2010/0069028 | A1 * | 3/2010 | Choi et al. | 455/136 |

OTHER PUBLICATIONS 36.211, 3rd Generation Partnership Project; Technical Specification Group Radio Access Network; Physical Channels and Modulation (Release 8), v 1.0.0 (Mar. 2007).
R1-01057, "Adaptive Antenna Switching for Radio Resource Allocation in the EUTRA Uplink," Mitsubishi Electric/Nortel/NTT DoCoMo, 3GPP RAN1#48, St. Louis, USA.
R1-071119, "A New DM-RS Transmission Scheme for Antenna Selection in E-UTRA Uplink," LGE, 3GPP RAN1#48, St. Louis, USA.
"Comparison of Closed-Loop Antenna Selection with Open-Loop Transmit Diversity (Antenna Switching Within a Transmit Time Interval (TTI))," Mitsubishi Electric, 3GPP RAN1#47bis, Sorrento, Italy.
3GPP TR 25.814, v1.2.2 "Physical Layer Aspects for Evolved UTRA.".

* cited by examiner

*Primary Examiner* — Chi Pham
*Assistant Examiner* — Alexander Boakye
(74) *Attorney, Agent, or Firm* — Dirk Brinkman; Gene Vinokur

(57) ABSTRACT

Embodiments of the invention describe a method for antenna selection (AS) in a wireless communication network, the network comprising user equipment (UE), wherein the UE comprises a plurality of subsets of antennas including a selected subset of antennas and an unselected subset of antennas, wherein only the selected subset of antennas is used for transmitting user data, and wherein the UE is configured to transmit only from a subset of antennas at a time. The method transmits the user data from the selected subset of antennas within a set of subframes, and transmits a sounding reference signal (SRS) from the unselected subset of antennas within at least one subframe in the set of subframes to enable antenna selection for user data transmission.

19 Claims, 23 Drawing Sheets

10

20

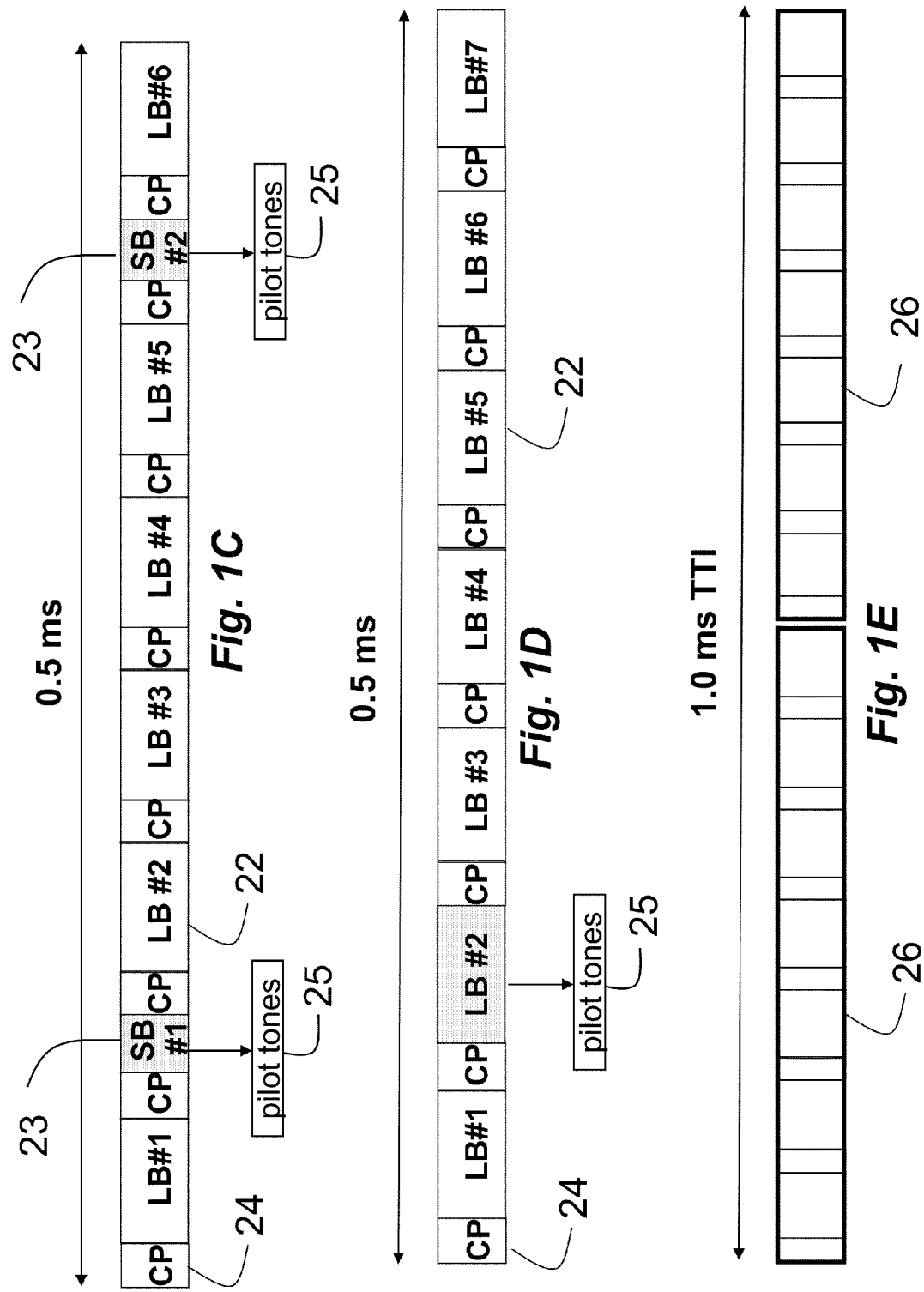

20

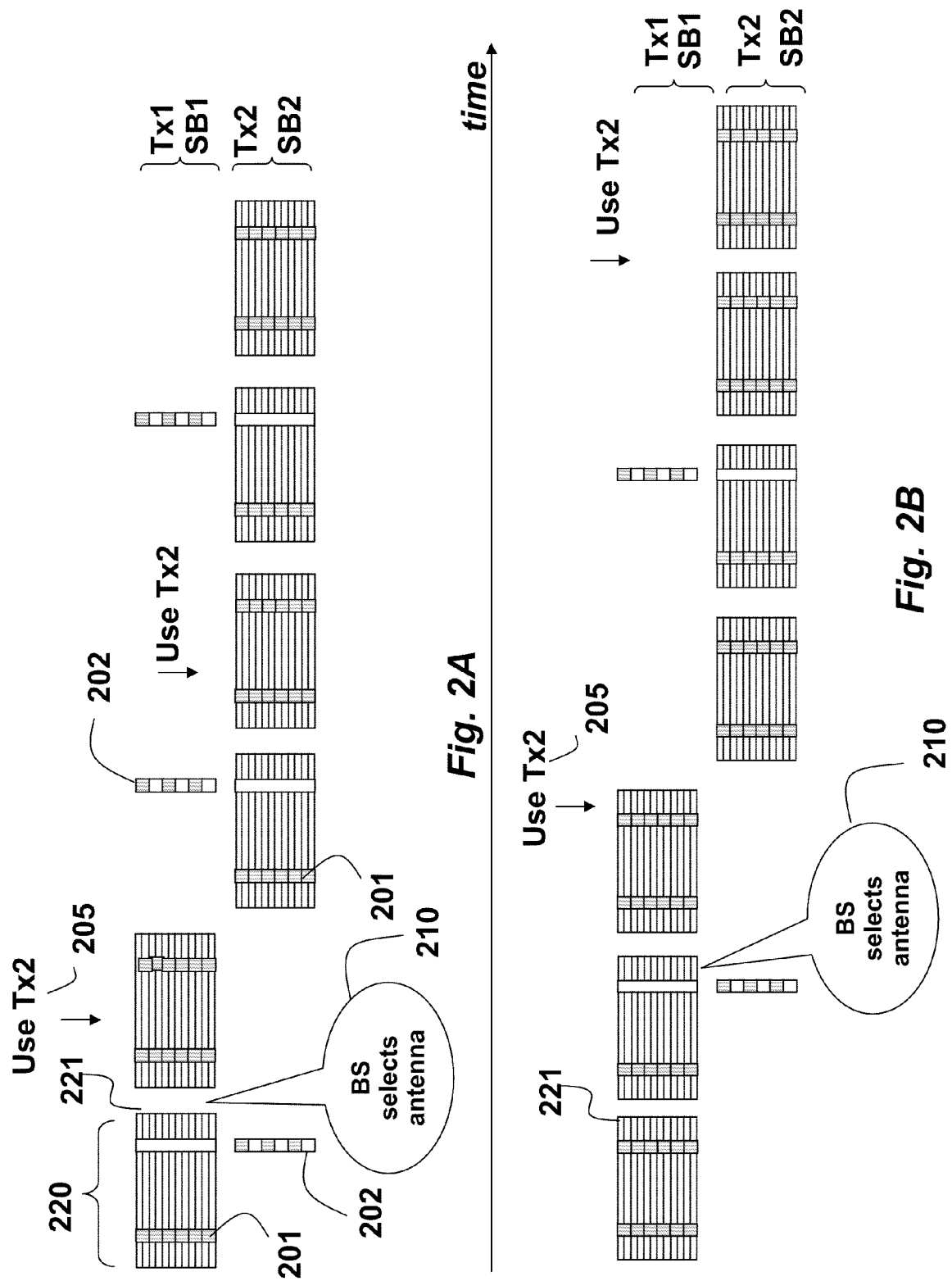

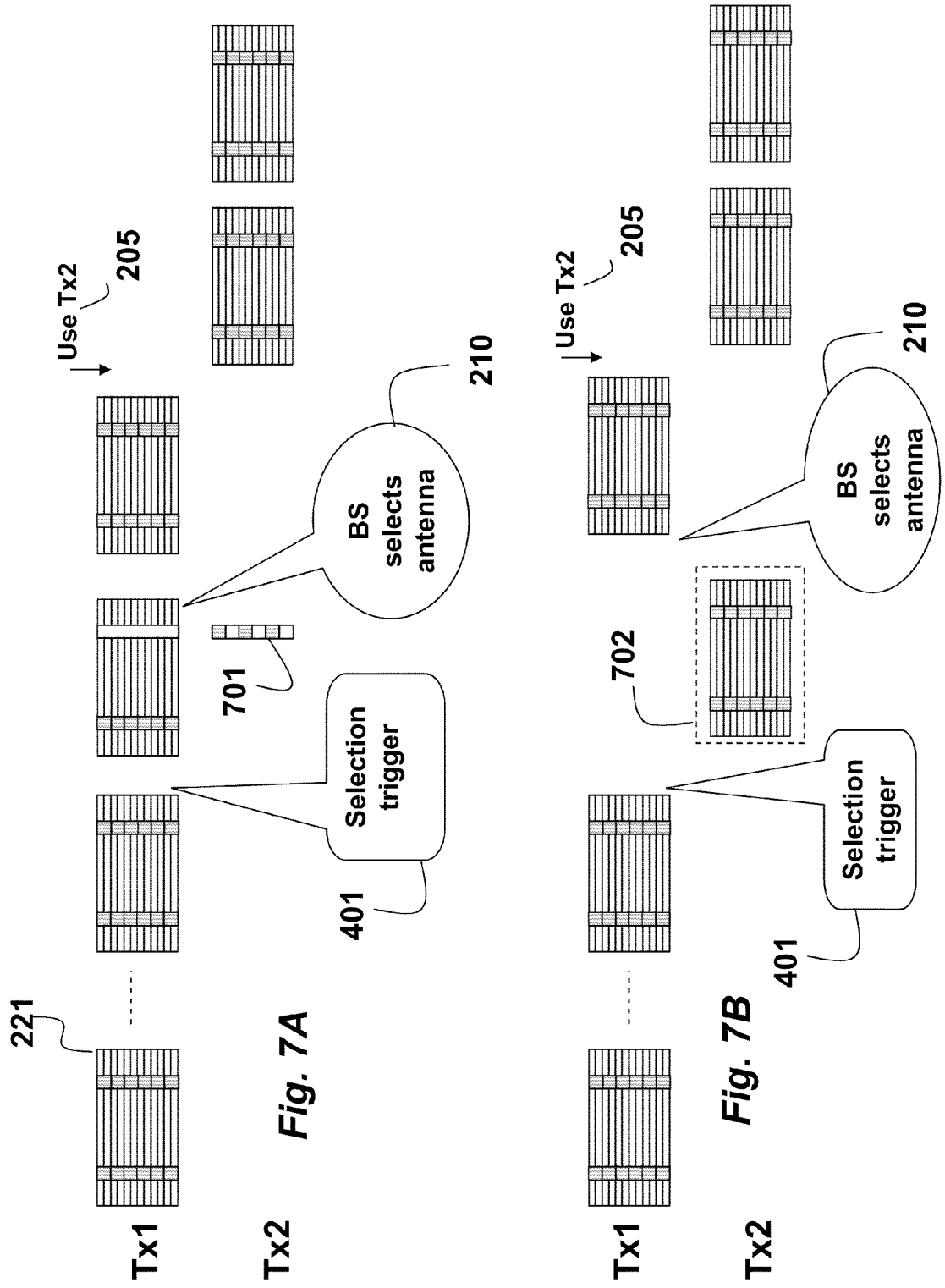

1400

METHOD AND SYSTEM FOR GENERATING ANTENNA SELECTION SIGNALS IN WIRELESS NETWORKS

RELATED APPLICATION

This application is a continuation of U.S. patent application Ser. No. 11/953,452, "Method and System for Generating Antenna Selection Signals in Wireless Networks," filed on Dec. 10, 2007 by Mehta et al.

FIELD OF THE INVENTION

This invention relates generally to generating antenna selection signals in wireless communication networks, and more particularly to selecting antennas in transceivers where the number of RF chains is less than the number of antennas.

BACKGROUND OF THE INVENTION

OFDM

In a wireless communication network, such as the $3^{rd}$ generation (3G) wireless cellular communication standard and the 3GPP long term evolution (LTE) standard, it is desired to concurrently support multiple services and multiple data rates for multiple users in a fixed bandwidth channel. One scheme adaptively modulates and codes symbols before transmission based on current channel estimates. Another option available in LTE, which uses orthogonal frequency division multiplexed access (OFDMA), is to exploit multi-user frequency diversity by assigning different sub-carriers or groups of sub-carriers to different users or UEs (user equipment). The system bandwidth can vary, for example, from 1.25 MHz to 20 MHz. The system bandwidth is partitioned into a number of subcarriers, e.g., 1024 subcarriers for a 5 MHz bandwidth.

The following standardization documents are incorporated herein by reference: 36.211, 3rd Generation Partnership Project; Technical Specification Group Radio Access Network; Physical Channels and Modulation (Release 8), v 1.0.0 (2007-03); R1-01057, "Adaptive antenna switching for radio resource allocation in the EUTRA uplink," Mitsubishi Electric/Nortel/NTT DoCoMo, 3GPP RAN1#48, St. Louis, USA; R1-071119, "A new DM-RS transmission scheme for antenna selection in E-UTRA uplink," LGE, 3GPP RAN1#48, St. Louis, USA; and "Comparison of closed-loop antenna selection with open-loop transmit diversity (antenna switching within a transmit time interval (TTI))," Mitsubishi Electric, 3GPP RAN1#47bis, Sorrento, Italy. According to the 3GPP standard, the base station is enhanced, and is called the "Evolved NodeB" (eNodeB).

MIMO

In order to further increase the capacity of a wireless communication system in fading channel environments, multiple-input-multiple-output (MIMO) antenna technology can be used to increase the capacity of the system without an increase in bandwidth. Because the channels for different antennas can be quite different, MIMO increases robustness to fading and also enables multiple data streams to be transmitted concurrently.

While MIMO systems perform well, they also can increase the hardware and signal processing complexity, power consumption, and component size in transceivers. This is due in part to the fact that each receive antenna requires a receive radio frequency (RF) chain, which typically comprises a low noise amplifier, a frequency down-converter, and an analog to digital converter. Similarly, each transmit antenna element requires an RF chain that comprises a digital to analog converter, a frequency up-converter, and a power amplifier.

Moreover, processing the signals received in spatial multiplexing schemes or with space-time trellis codes requires receivers where the complexity can increase exponentially as a function of the number of antenna.

Antenna Selection

Antennas are relatively simple and cheap, while RF chains are considerably more complex and expensive. Antenna selection reduces some of the complexity drawbacks associated with MIMO systems. Antenna selection reduces the hardware complexity of transmitters and receivers by using fewer RF chains than the number of antennas.

In antenna selection, a subset of the set of available antennas is adaptively selected by a switch, and only signals for the selected subset of antennas are connected to the available RF chains for signal processing, which can be either transmitting or receiving. As used herein, the selected subset, in all cases, means one or more of all the available antennas in the set of antennas. Note, that invention also allows multiple subsets to be used for training. For example, there can be four antennas and one RF chain, or eight antennas and two RF chains, which includes four subsets.

Antenna Selection Signals
Pilot Tones or Reference Signals

In order to select the optimal subset of antennas, all channels corresponding to all possible transmit and receive antenna subsets need to be estimated, even though only a selected optimal subset of the antennas is eventually used for transmission.

This can be achieved by transmitting antenna selections signals, e.g., pilot tones, also called reference signals, from different antennas or antenna subsets. The different antenna subsets can transmit either the same pilot tones or use different ones. Let $N_t$ denote the number of transmit antennas, $N_r$ the number of receive antennas, and let $R_t=N_t/L_t$ and $R_r=N_r/L_r$ be integers. Then, the available transmit (receive) antenna elements can be partitioned into $R_t(R_r)$ disjoint subsets. The pilot repetition approach repeats, for $R_t \times R_r$ times, a training sequence that is suitable for an $L_t \times L_r$ MIMO system. During each repetition of the training sequence, the transmit RF chains are connected to different subsets of antennas. Thus, at the end of the $R_t \times R_r$ repetitions, the receiver has a complete estimate of all the channels from the various transmit antennas to the various receive antennas.

In case of transmit antenna selection in frequency division duplex (FDD) systems, in which the forward and reverse links (channels) are not identical, the receiver feeds back the optimal set of the selected subset of antennas to the transmitter. In reciprocal time division duplex (TDD) systems, the transmitter can perform the selection independently.

For indoor LAN applications with slowly varying channels, antenna selection can be performed using a media access (MAC) layer protocol, see IEEE 802.11n wireless LAN draft specification, I. P802.11n/D1.0, "Draft amendment to Wireless LAN media access control (MAC) and physical layer (PHY) specifications: Enhancements for higher throughput," Tech. Rep., March 2006.

Instead of extending the physical (PHY) layer preamble to include the extra training fields (repetitions) for the additional antenna elements, antenna selection training is done by the MAC layer by issuing commands to the physical layer to transmit and receive packets by different antenna subsets. The training information, which is a single standard training sequence for a $L_t \times L_r$ MIMO system, is embedded in the MAC header field.

OFDMA Structure in LTE

The basic uplink transmission scheme is described in 3GPP TR 25.814, v1.2.2 "Physical Layer Aspects for Evolved UTRA." The scheme is a single-carrier transmission (SC-OFDMA) with cyclic prefix (CP) to achieve uplink inter-user orthogonality and to enable efficient frequency-domain equalization at the receiver side.

LTE Reference Signals

3GPP LTE envisages using two kinds of reference signals. Both the reference signals are transmitted in one or more of the long blocks (LB) of the TTI, or its short blocks, if available.

Data Modulation Reference Signals

The data modulation (DM) reference signal is transmitted along with data in the subcarriers assigned to the user equipment. These signals help the eNodeB (Base station) receiver to acquire an accurate estimate of the channel, and thereby coherently decode the received signal.

Broadband Sounding Reference Signals (SRS)

The broadband SRS is meant to help the eNodeB to estimate the entire frequency domain response of the uplink channel from the user to the eNodeB. This helps frequency-domain scheduling, in which a subcarrier is assigned, in principle, to the user with the best uplink channel gain for that subcarrier. Therefore, the broadband SRS can occupy the entire system bandwidth, e.g., 5 MHz or 10 MHz. Alternatives have also been proposed in which the broadband SRS occupies a fraction of the system bandwidth and is frequency hopped over multiple transmissions in order to cover the entire system bandwidth.

SUMMARY OF THE INVENTION

The objective of the invention is to provide training for antennas selection (AS) during the transmission of user data.

User equipment (UE), while transmitting the user data from a selected antenna, needs to periodically and dynamically update the selected antenna as channel condition vary. Therefore, there is a need for a method for selecting antenna while transmitting the user data.

Embodiments of the invention provide a solution for abovementioned problem by transmitting the SRS and user data using only the selected antennas, and concurrently transmitting the SRS from the unselected antennas. Thus, the base station can determine the optimal antenna from both the selected and unselected antennas.

Embodiments of the invention describe a method for antenna selection (AS) in a wireless communication network, the network comprising user equipment (UE), wherein the UE comprises a plurality of subsets of antennas including a selected subset of antennas and an unselected subset of antennas, wherein only the selected subset of antennas is used for transmitting user data, and wherein the UE is configured to transmit only from a subset of antennas at a time. The method transmits the user data from the selected subset of antennas within a set of subframes, and transmits a sounding reference signal (SRS) from the unselected subset of antennas within at least one subframe in the set of subframes to enable antenna selection for user data transmission.

BRIEF DESCRIPTION OF THE DRAWINGS

FIG. 1B-1E are block diagrams of transmit time intervals according to embodiments of the invention;

FIG. 2-13 are block diagrams of antenna selection signals according to embodiments of the invention;

DETAILED DESCRIPTION OF THE PREFERRED EMBODIMENTS

The embodiments of the invention provide a method and system for generating and transmitting antenna selection signals selection in wireless networks. More specifically, the invention can be used in transceivers where the number of RF chains is less than the number of antennas, e.g., one transmit RF chains for two transmit antennas, or two transmit RF chains for four transmit antennas. It should be understood that the receive antennas can also be coupled to correspondingly fewer receive RF chains. It should be noted that the techniques described herein can work with receivers that have only a single antenna. The invention is applicable to networks designed according to 3GPP, 4G cellular, WLAN, WiBro, WiMAX, and IEEE 802.20 standards.

Figure 1A:
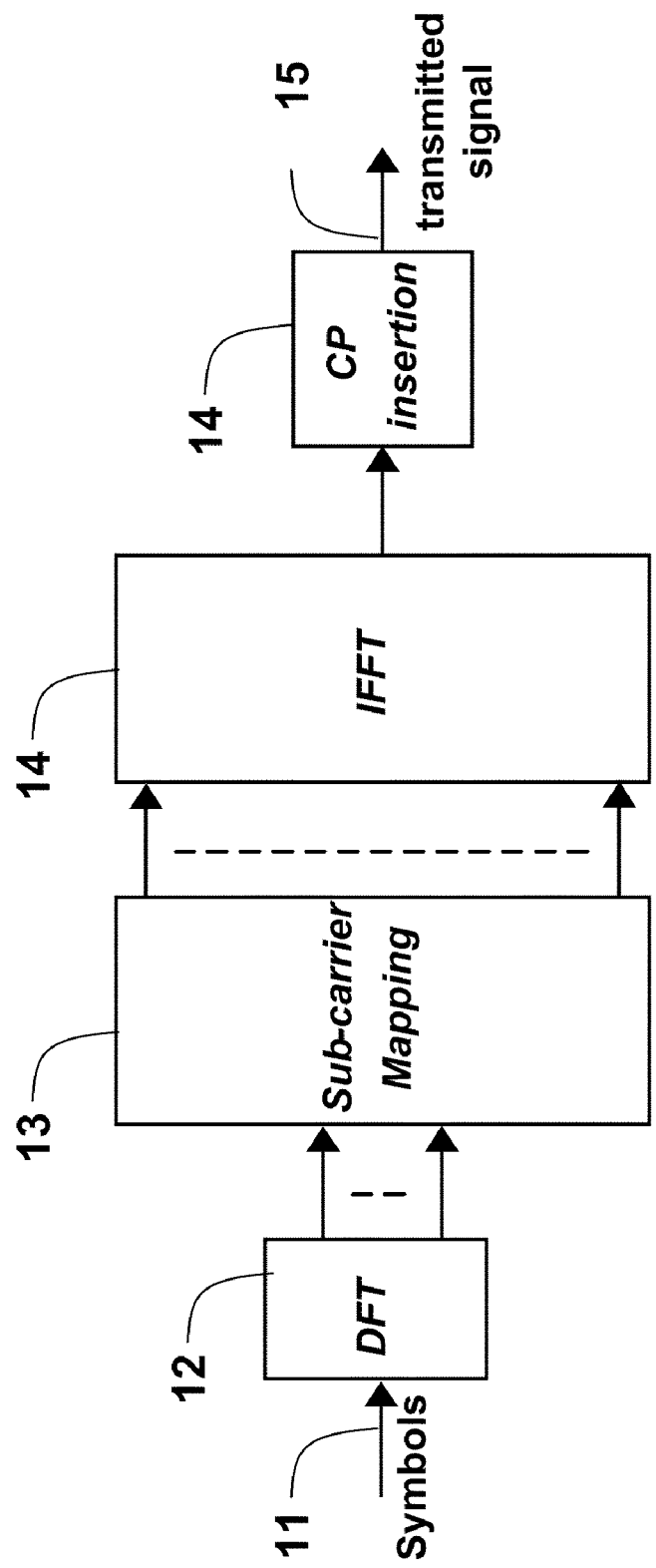
FIG. 1A is a block diagram of a baseband transmission chain according to an embodiment of the invention.

FIG. 1A shows a portion of a transmit RF chain 10 for a discrete Fourier transform (DFT)-spread OFDM transceiver used by the embodiments of the invention. Symbols 11 are encoded using a DFT 12, followed by sub-carrier mapping 13, and an inverse fast Fourier transform (IFFT) 14, followed by cyclic prefix (CP) insertion 14 to produce the transmitted signal 15. The sub-carrier mapping 13 determines the frequencies used for transmission.

Figure 1B:
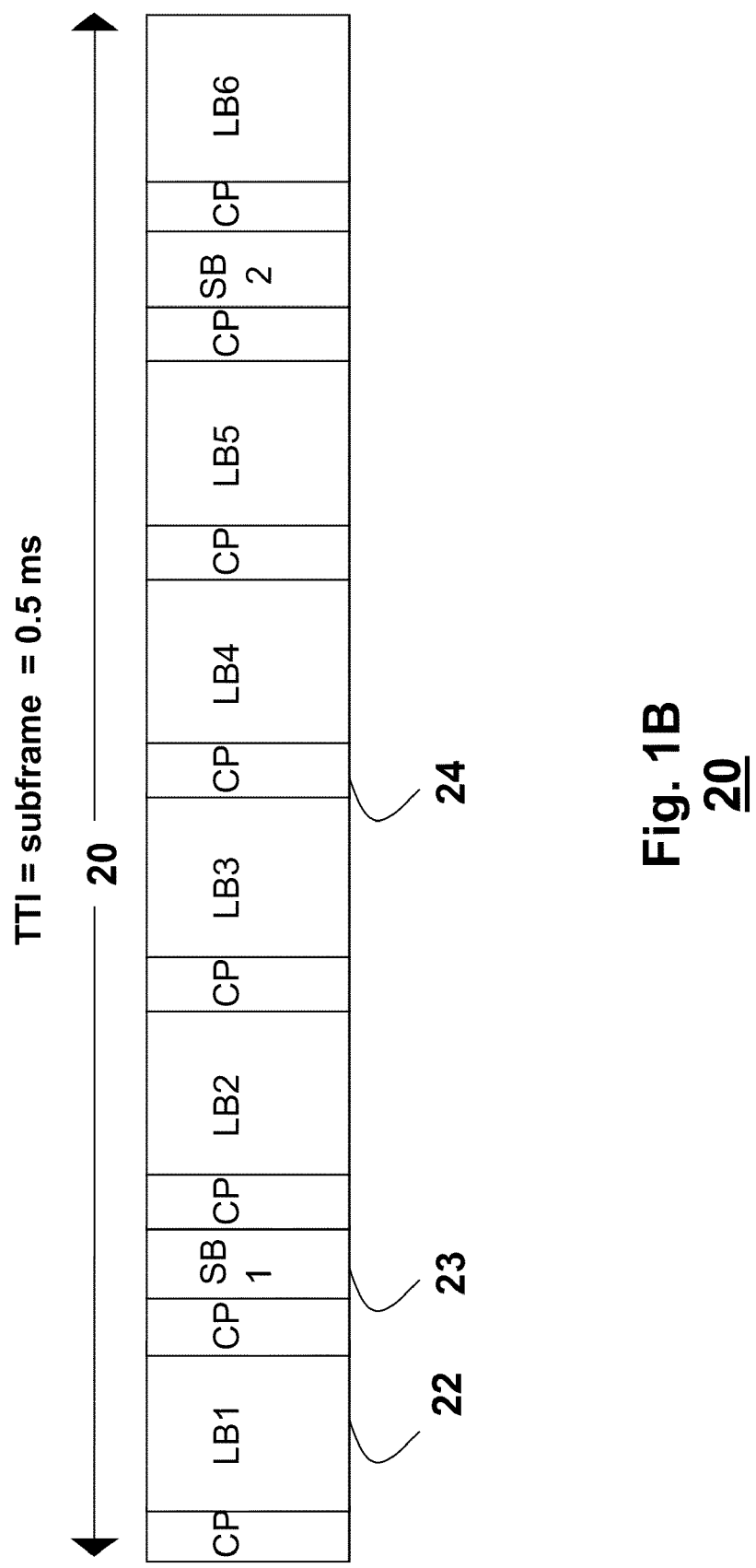

FIG. 1B shows the basic structure of a transmission sub-frame or time interval (TTI) 20. The transmission is divided into time slots of duration 0.5 ms. A frame is 10 ms long. Hereinafter, the term TTI and subframe are used interchangeably. A TTI includes one or more time slots. The TTI 21 includes long blocks (LB) 22 and short blocks (SB) separated by CPs 24. In the case the TTI is 1.0 ms long, the frame has 12 LBs and 4 SBs.

FIG. 1C shows a TTI with one time slot considered for 3GPP LTE. The TTI has a duration of 0.5 ms. The TTI includes cyclic prefixes (CP) 24, long blocks (LB) 22, and short blocks (SB) 23. The symbols in the short blocks can be used to transmit pilot tones 25. The long blocks are used to transmit information or control symbols (user data). Thus, the TTI includes six LBs and two SBs.

FIG. 1C shows another 0.5 ms TTI with one time slot considered for 3GPP LTE. In this case, all the OFDM symbols are of the same length and are long blocks. One or more of the LBs in the time slot are used to transmit pilot tones, while the other LBs are used to transmit information (data). In effect, this TTI consists of seven LBs.

FIG. 1E shows a TTI with multiple time slots 26. For example, the TTI is 1.0 ms long and includes two time slots 26. The time slots can be partitioned as in FIGS. 1B-1D. In this case, the TTI consists of 14 LBs.

Figure 1F:
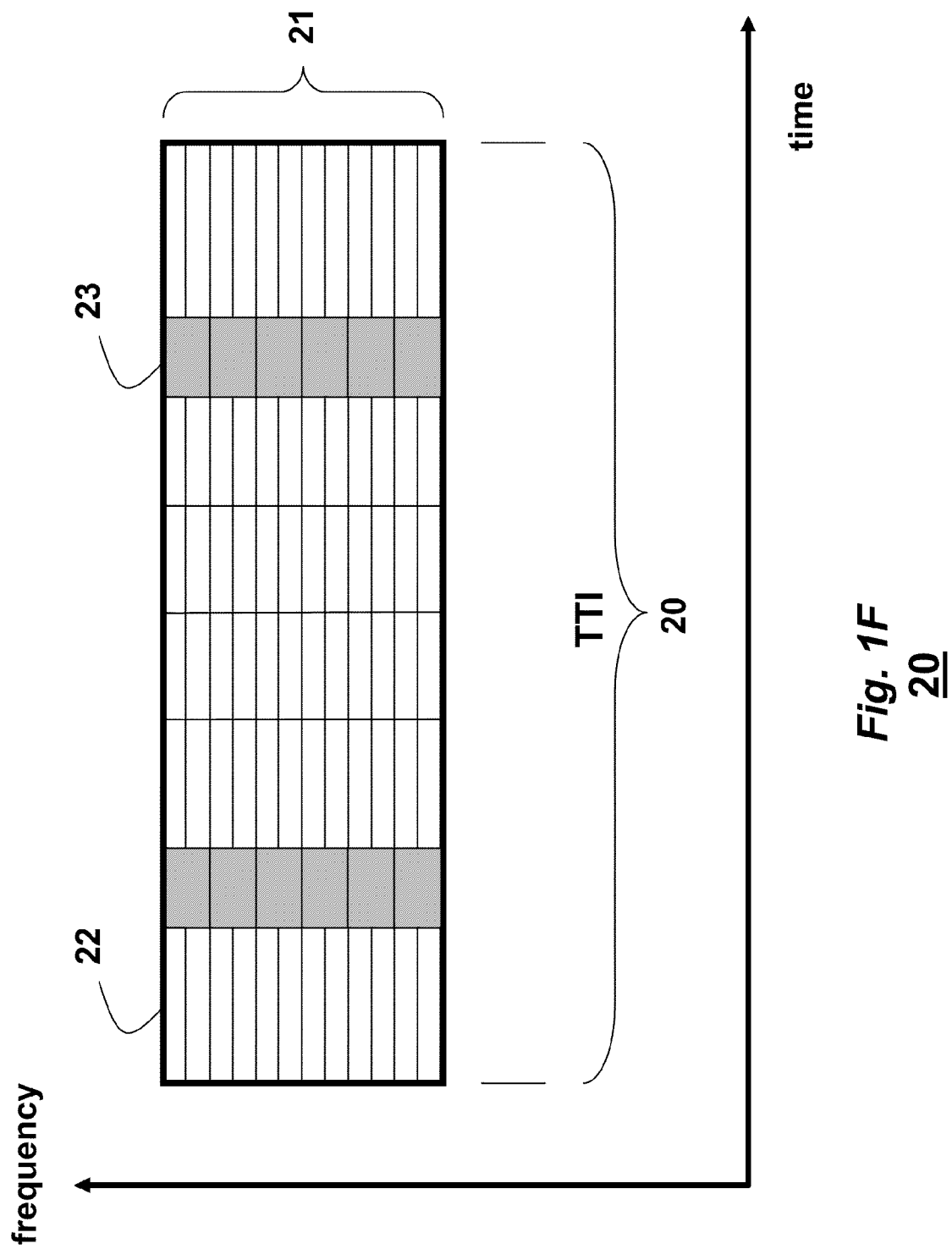
FIG. 1F is a block diagram of a resource block according to an embodiment of the invention.

FIG. 1F shows the basic structure of a resource block (RB) 21 during the transmission time interval (TTI) 20 according to an embodiment of the invention. The vertical axis indicates frequency, and the horizontal axis time, which is partitioned as per the earlier description of a TTI. Therefore, the RB is partitioned in time into the long blocks (unshaded) 22, and the short blocks (shaded) 23, e.g., 6 or 12 long blocks, and 2 or 4 short blocks. The long blocks are used for control and data signals, and the short blocks are used for data modulation (DM) reference signals. Another possible structure of the RB includes only long blocks and no short blocks, e.g., 7 LBs in a 0.5 ms slot or 14 LBs in a 1.0 ms duration. In frequency domain, the resource block consists of a number of subcarriers, e.g., 14 subcarriers.

If SBs are present, they are used for DM and broadband SRSs. If only LBs are present in the RB, then one or more of the LBs is used for the DM RS and broadband SRS. Multiple RBs can be assigned to an uplink user. These RBs can but need not be contiguous. Furthermore, the subcarriers that comprise an RB can be contiguous or distributed over the system bandwidth or a portion thereof.

The DM and broadband sounding reference signals can also be used for the purpose of antenna selection training. The DM/broadband RS and AS RS can be the same, it is only their use that differs. DM signals are used to demodulate the data in the other long blocks, while the AS RSs are used for channel estimation for the purpose of antenna selection. The use of the broadband SRS for antenna selection has the advantage of facilitating joint frequency domain scheduling and antenna selection. It should be noted, that channel estimation in a receiver is well known. It should be noted that the invention is not limited to a specific number of long and short blocks during the TTI. For clarity, the CPs are not shown in FIG. 1F.

The antenna selection signals according to one embodiment of the invention can use orthogonal frequency division multiplexing (OFDM).

To enable antenna selection for the uplink from user equipment (UE) to a base station (BS), the UE transmits DM RS or broadband SRSs from subsets of available transmit antennas. The BS estimates the channels and selects an optimal (best) subset of the transmit antennas. In case of an FDD system, the BS also feeds back information related to the selected subset of antennas to the UE. Then, the UE uses the selected transmit antennas for future transmissions to the BS. The selecting can be performed periodically, or on demand. In the later case, notification is required before training or selecting can commence. It should be noted, that the selection can be for the same antenna subset that was previously used. The selected antennas can also be used for receiving user data, which is well suited for a slow-varying TDD system in which the uplink and downlink channels are reciprocal.

Given that there are fewer RF chains than antennas, the pilot tones are transmitted by different sets of antennas using frequency division multiplexing (FDM) or code division multiplexing (CDM) in a time division multiplexed (TDM) manner, consistent with the basic RB structure shown in FIG. 1F.

In the description below, we first consider a UE with one RF chain and two transmit or receive antennas, and FDM pilot tones. These schemes are then extended for use with CDM pilot tones. Next, we consider two RF chains and four antennas for both FDM and CDM pilot tones. Further extensions based on this description are also possible. We then consider schemes that differentiate between the selected subset of antennas, i.e., the ones that are transmitting or have transmitted data currently, and the other unselected antennas. The differentiation lies in how often the AS RS is transmitted by selected and unselected antenna subsets.

As defined herein, the selected antenna subset most recently transmitted user data, while the unselected antenna subsets usually only transmit the antenna selection signals. As per an embodiment of the invention, the unselected antenna subsets transmit the AS signals less frequently than the selected antenna subset.

We consider two cases of antenna training: antenna training and selection occur within one TTI, and antenna training and selection occur between multiple TTIs.

For each of these cases, we describe periodic and on demand antenna selection. We describe the use of various alternative pilot tones for antenna selection, such as the data modulation (DM) RSs, broadband SRSs, or hybrid schemes.

In the examples below for UE with one transmit RF chain and two antennas (Tx1 and Tx2), we assume that one block (SB1) is used to transmit data, control and DM signals, while the another (SB2) is used to transmit periodically AS signals for the slot structure with six LBs and two SBs. For the 1 ms TTI that includes LBs (and no SBs), two LBs, e.g., LB4 and LB11, are used to transmit the DM and broadband SRSs. The BS estimates the channel from the reference signals, and makes an antenna selection decision accordingly. For the purpose of this description, we assume that there is a delay between BS notification of the selection and the actual switching in the UE.

Training When Antenna Selection Occurs Within a TTI Using DM RSs

As shown in FIGS. 2A and 2B, antenna selection and training can be performed by generating the AS signal periodically. FIG. 2A shows antenna selection every second TTI, and FIG. 2B shows antenna selection every third TTI.

As shown in FIG. 2A, during a first TTI 220, the UE begins by transmitting most of the RB 221, including all long blocks and the DM signal 201 in SB1 with a selected antenna, e.g., the antenna Tx1 to be used is known to the BS. However, the AS signal 202 of the RB 221 is transmitted from an unselected antenna (Tx2) in SB2. As used herein, unselected means using another subset of antennas than the subset of antennas used for transmitting the data symbols in the RB most recently. That is, the UE transmits symbols in one TTI with different subsets of antennas.

For the 1 ms TTI, which includes 3 slots with 2 LBs used for DM signals, the UE begins by transmitting most of the RB, including all the LBs (1-3, 5-14) for data and LB4 for DM signal. However, the AS signal of the RB is transmitted from an unselected antenna in LB11.

As shown, the AS signal 202 can be a "low overhead" signal because it either uses fewer reference signal carriers, e.g., half the number as shown in FIG. 2A, in the case of FDM signals tones, or a lower power for CDM signals.

The BS selects 210 a subset (one in the case of two antennas) of antennas using the DM signal 201 for Tx1 and the AS signal 202 for Tx2. Some time after making the selection, the BS feeds back the selection, e.g., "use Tx2 205," to the UE. The UE switches to the selected transmit antenna Tx2 for the next TTI after receiving the feedback. As shown in FIGS. 2A and 2B, this training process is repeated periodically.

FIGS. 2A-2B also show that the amount of overhead, in terms of return path forwarding (RPF) for FDM signals and power for CDM signals, can be reduced because the estimation accuracy required for antenna selection is less than required for coherent demodulation. The amount of overhead reduction involves a trade-off between selection accuracy and pilot tone overhead reduction.

Using Broadband SRSs

Figures 3A, 3B:
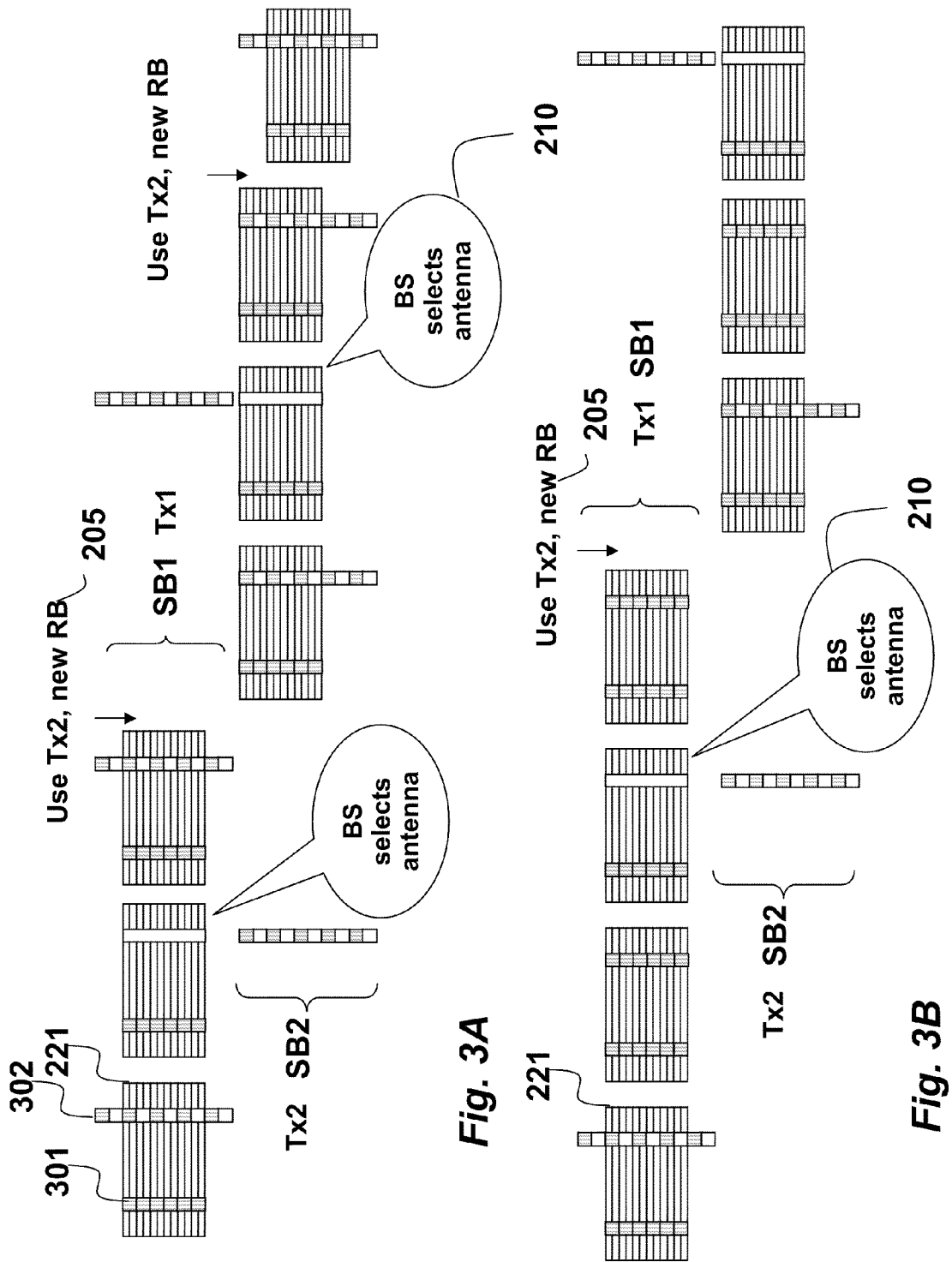

As shown in FIGS. 3A and 3B for the uplink channel, antenna training and selection can also be implemented using broadband sounding RS 302. These signals are known as channel quality indicator (CQI) pilot signals. The CQI signals are transmitted to enable channel selection and frequency domain allocation at the BS. Note, the bandwidth of the CQI pilots is greater than the bandwidth of the RB.

As shown in FIGS. 3A-3B, one block (SB1) is used for the data signals (long blocks) and the DM signals 301 of most of the RB, and the other block (SB2) is used for the CQI signals 302. FIG. 3A shows joint antenna selection and resource block assignment using the CQI signals 302 for every TTI.

FIG. 3B shows joint antenna selection and resource block assignment using the CQI signals transmitted every multiple TTIs, e.g., two or more. Generally, the CQI signals are transmitted in every TTI, or periodically every multiple TTIs.

This enables the BS to estimate the broadband frequency response of the channels for both antennas. Using the CQI signals for training and selection has the additional advantage of enabling joint resource block carrier frequency assignment and antenna selection, which improves the efficiency of frequency domain scheduling. The UE can switch transmit antennas as well as frequencies used in the RB.

On-Demand Adaptive Antenna Training and Selection

Figure 4:
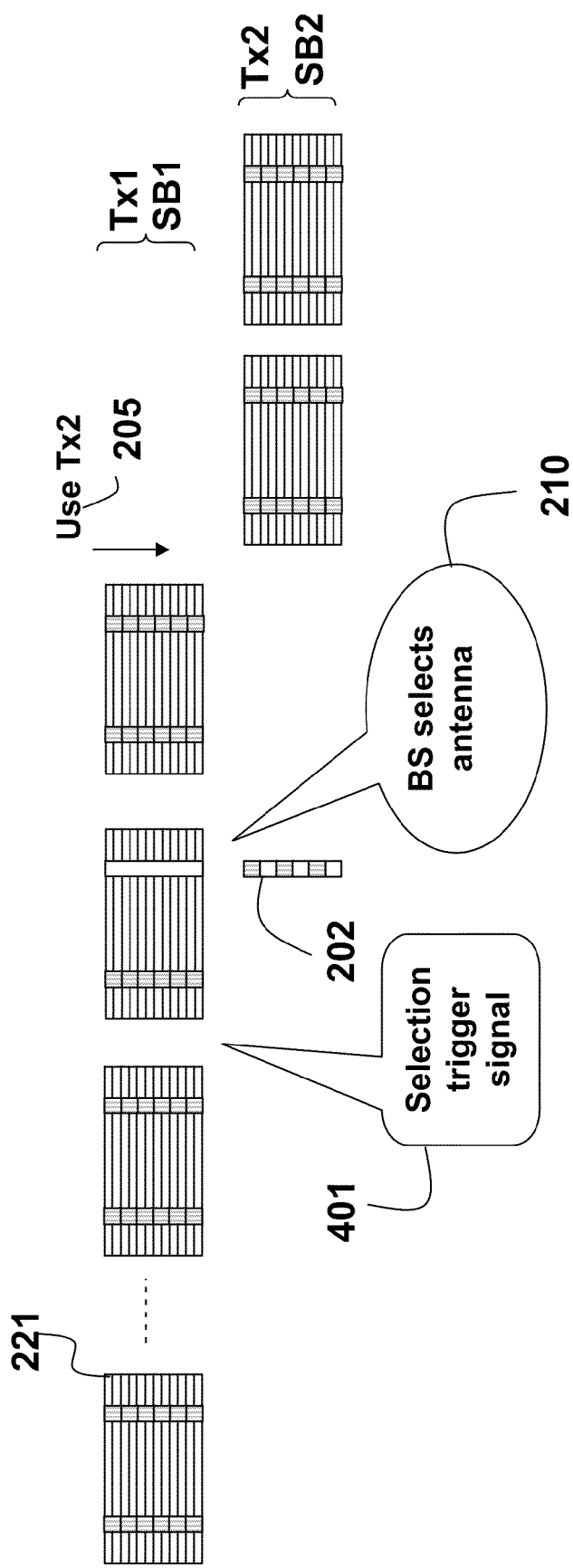

Instead of transmitting the AS signals periodically, the AS signals can be transmitted only when the performance of the current antenna falls below a desired threshold as shown in FIG. 4. A history of signal interference and noise ratio (SINR) estimates, hybrid automatic repeat-request (HARQ) state, or modulation and coding scheme (MCS) processes can be maintained to determine when antenna selection is required. The history can be collected by either the UE or the BS.

After a decision has been made, by either the UE or the BS, to perform antenna training and selection, using e.g., a selection trigger signal 401, the UE transmits the AS signals during the next TTI, by using either the AS signal 202 or the CQI signals as described above. Then, the BS can estimate the channels for both antennas, select an antenna 210, and send the decision to use Tx2 205 back to the UE. In this case, the performance improves when the UE explicitly informs the BS about the form of the AS signal.

Training When Antenna Selection Occurs Between TTIs

We now describe the corresponding cases when antenna training and selection occurs between TTIs and not within a TTI as described above. Selecting between TTIs further simplifies the implementation complexity at the UE, with some extra delay in selecting the optimal set of antennas.

Using Entire TTIs

Figure 5:
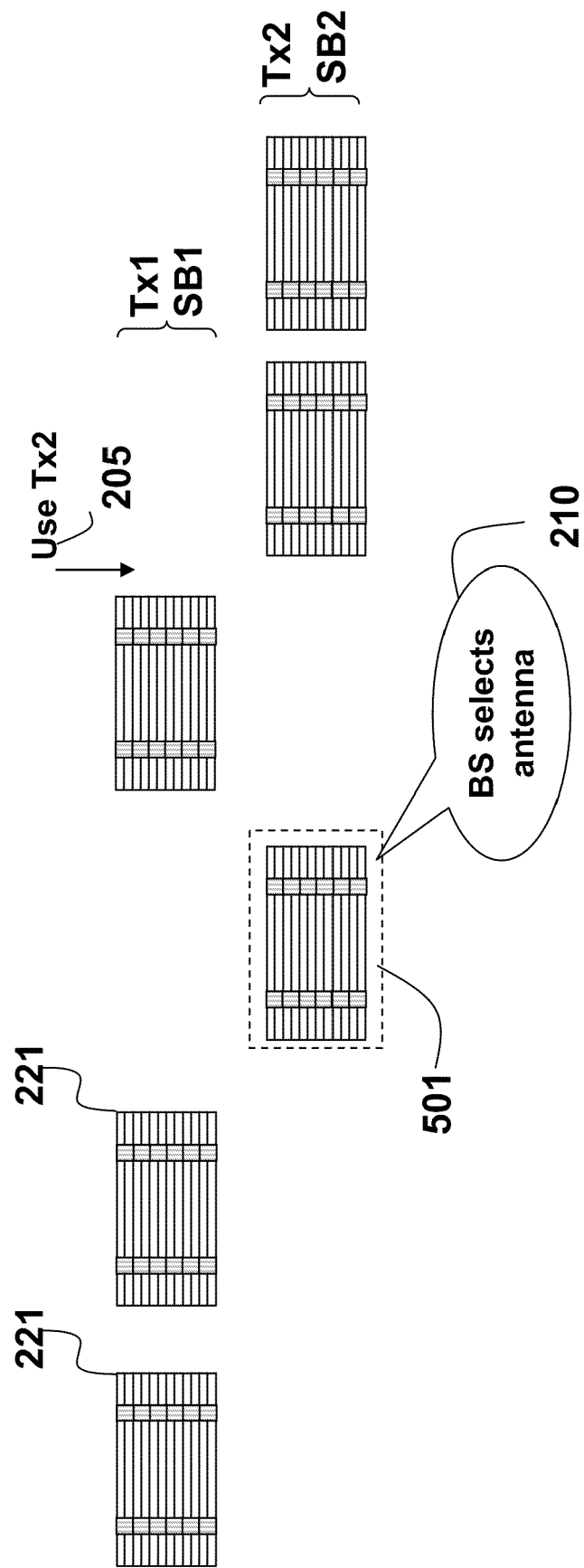
Figure 6:
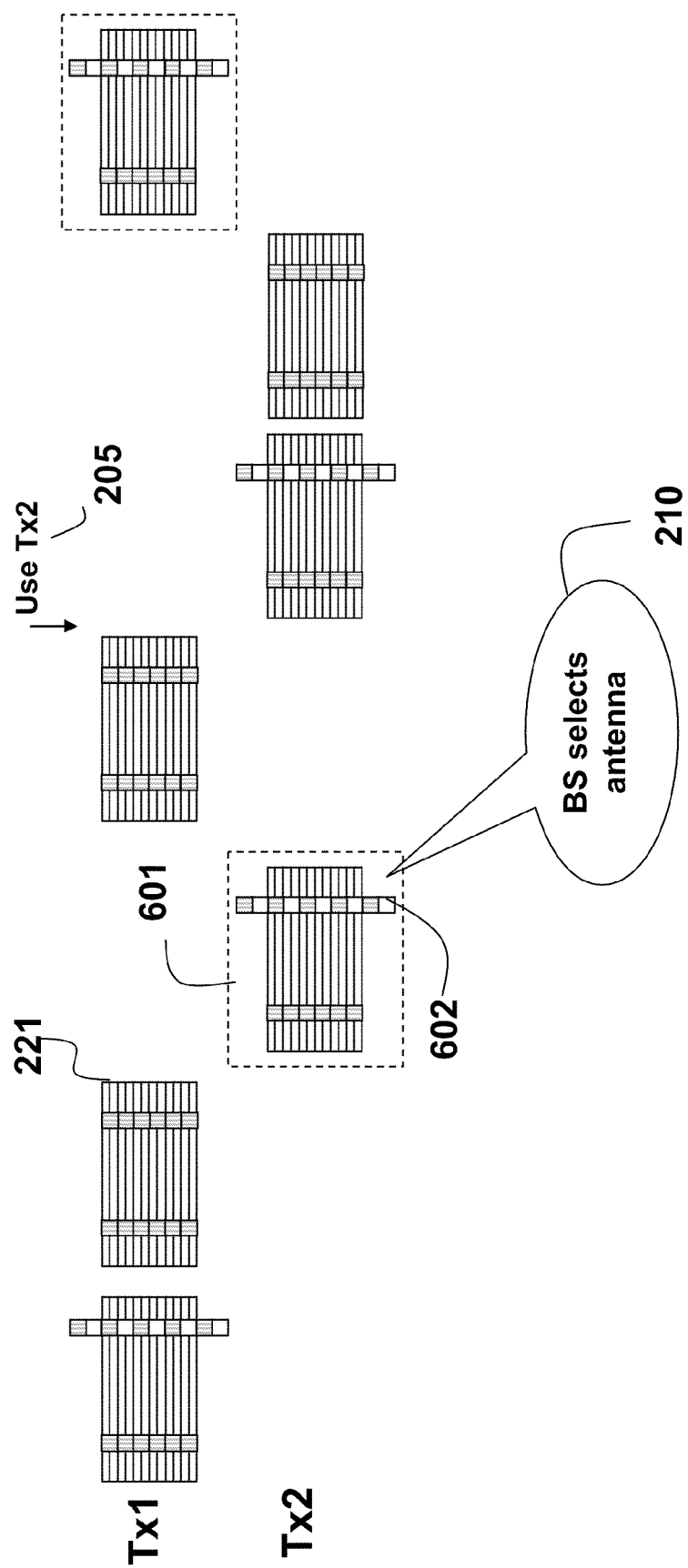

FIGS. 5 and 6 shows how transmit antenna selection and training can be implemented when the UE can only switch antennas between the TTIs. The UE transmits the RBs 221 normally using the selected antenna. The RB is transmitted periodically using the unselected antenna Tx2. By using the channel estimates from the previous TTIs, the BS can now select 210 the optimal antenna for the UE, and feed back its decision Tx2 205 back to the UE. This mechanism shows that a TTI can be used for antenna training and selection, as well as user data transmission.

FIG. 6 shows the same process for CQI signals 602. The TTI 601 that is transmitted with the unselected antenna includes data and the broadband sounding RSs 602, and DM pilots, if present. As described above, using the TTI with the CQI signals also enables a joint resource block reassignment and antenna selection. It should be noted, that the periodicity of using the unselected antenna can vary from what is described above.

However, the transmission with the unselected antenna Tx2 needs to be done with a conservative lower rate MCS because the channel for Tx2 may not be known at either the BS or UE. The RB that is transmitted with the unselected antenna includes data and pilot tones. While the initial transmission with the unselected antenna requires a conservative choice of the MCS, previous channel estimates coupled with the current channel estimate can be used to obtain a more reliable, and perhaps less conservative MCS choice for sequent transmissions of RBs from the unselected antenna.

On-Demand Adaptive Training

FIGS. 7A and 7B show on-demand adaptive antenna selection in response to the selection trigger 401. The UE transmits using the selected antenna (Tx1) until the performance of that antenna is less than a pre-determined threshold, measured as described above. The UE sends the trigger signal 401, and in the next TTI the UE initiates training by either sending just the AS pilot signal 701 with the unselected antenna as shown in FIG. 7A, or the entire RB 702 as shown in FIG. 7B.

In one embodiment of the invention, the UE reverts back to Tx1 for the sequent TTI, and for the select signal 205. In another embodiment, the UE continues to use antenna Tx2, unless the BS directs the UE to switch to another subset of antennas.

Multiple Antenna Subset Selection

In the examples below, we describe how antenna selection can be implemented in a UE with two RF chains and four transmit antennas. With two RF chains, the reference signals of two antennas are sent simultaneously in a FDM or CDM manner as described above. The reference signal sub-carriers for the different antennas are shown using two different patterns.

FDM Pilots

Figure 8A:
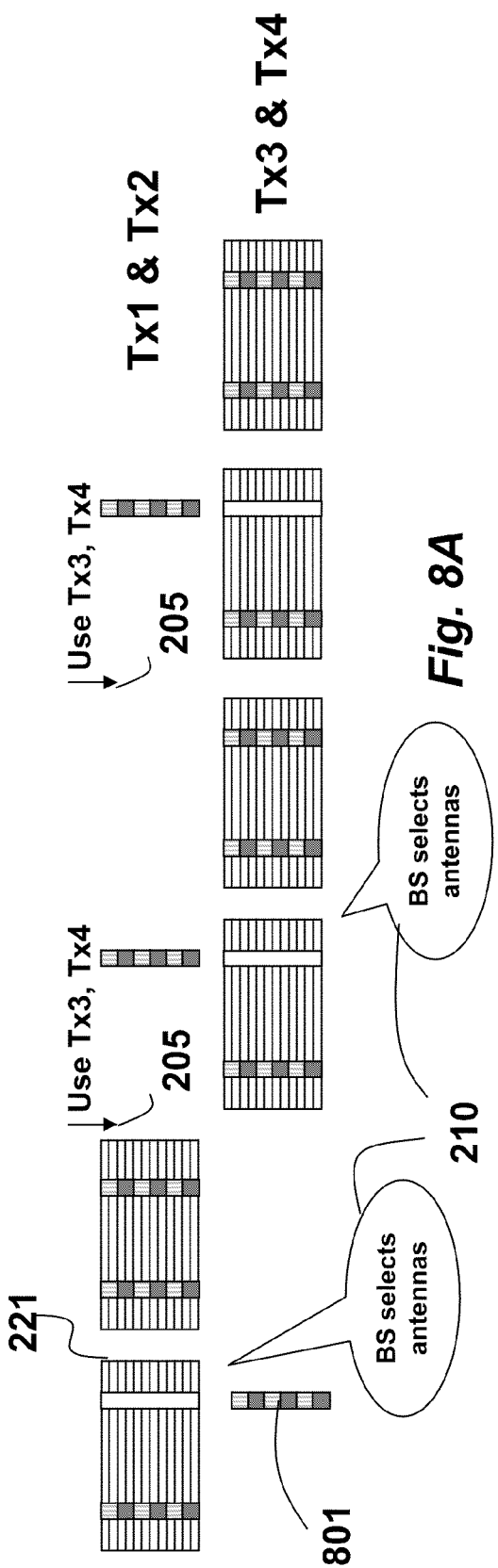
Figure 8B:
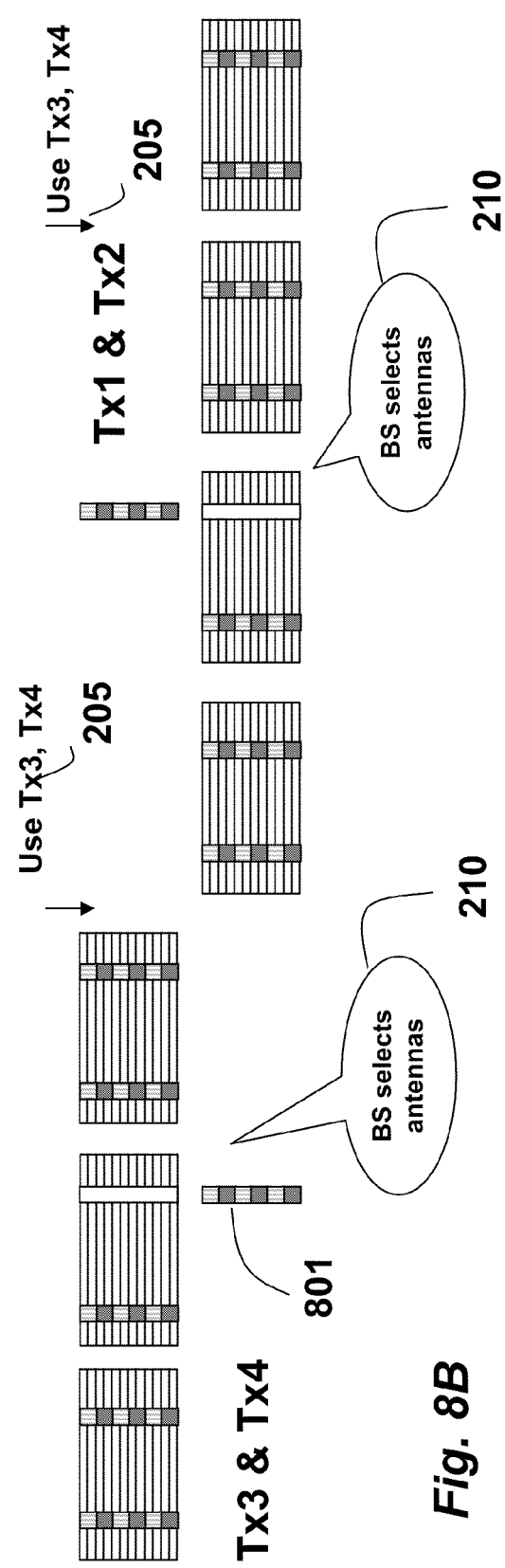

As before, we describe antenna selection using the AS signals or the broadband sounding reference signals. FIG. 8A shows periodically sending the AS signal 801 during every other TTI via a pair of unselected antennas (Tx3 and Tx4), while FIG. 8B shows the AS signal 801 in every third TTI.

CDM Pilots

Figures 9A, 9B:
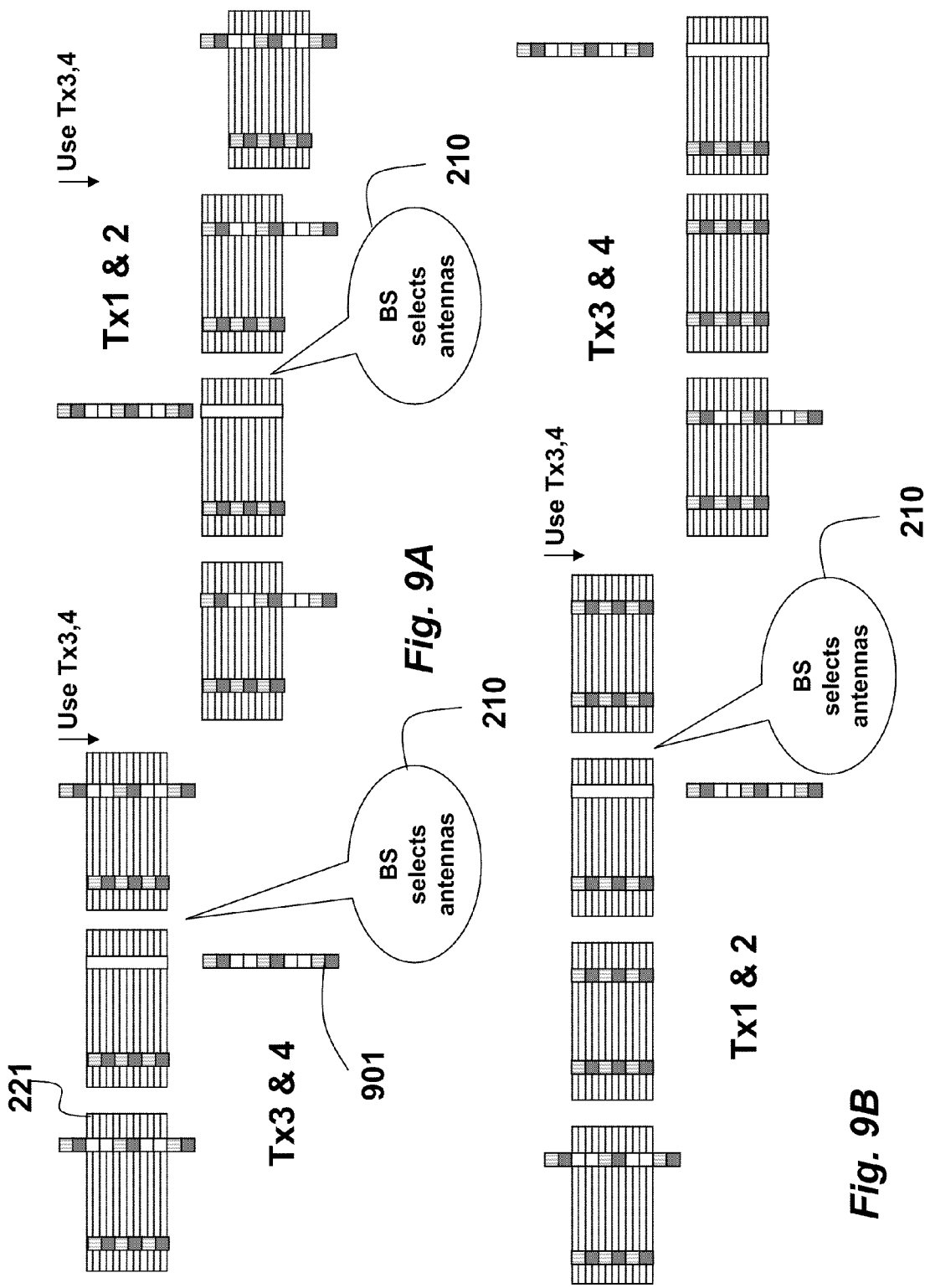

FIGS. 9A-9B show antenna training and selection with periodic FDM broadband sounding reference signals 901 and RB assignment, for every other TTI and every third TTI, respectively using a pair of unselected antennas, e.g., Tx3 and Tx4.

Figure 10A:
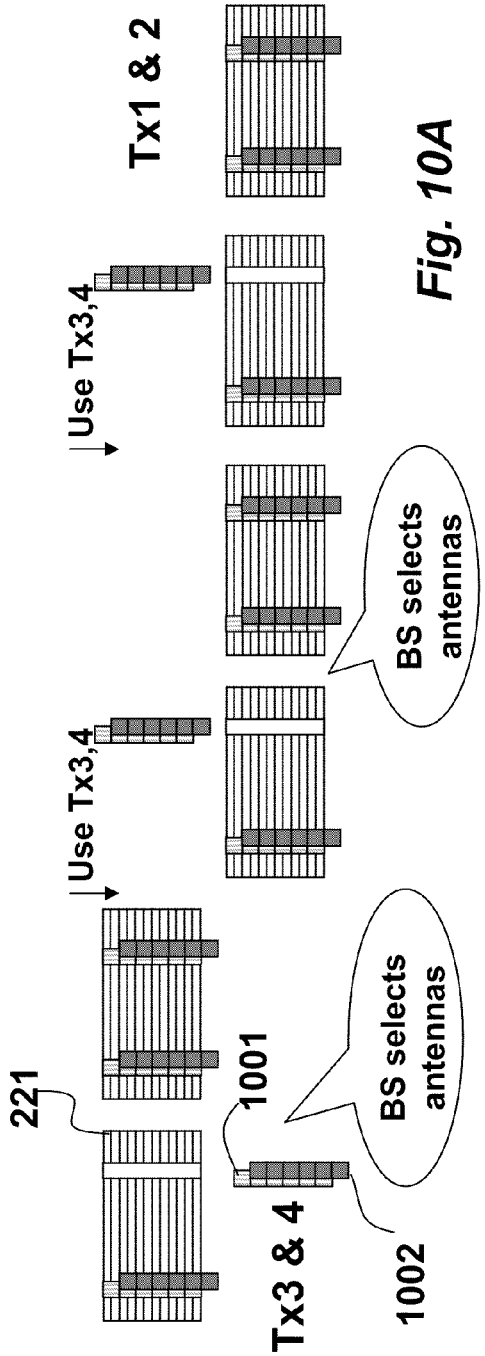
Figure 10B:
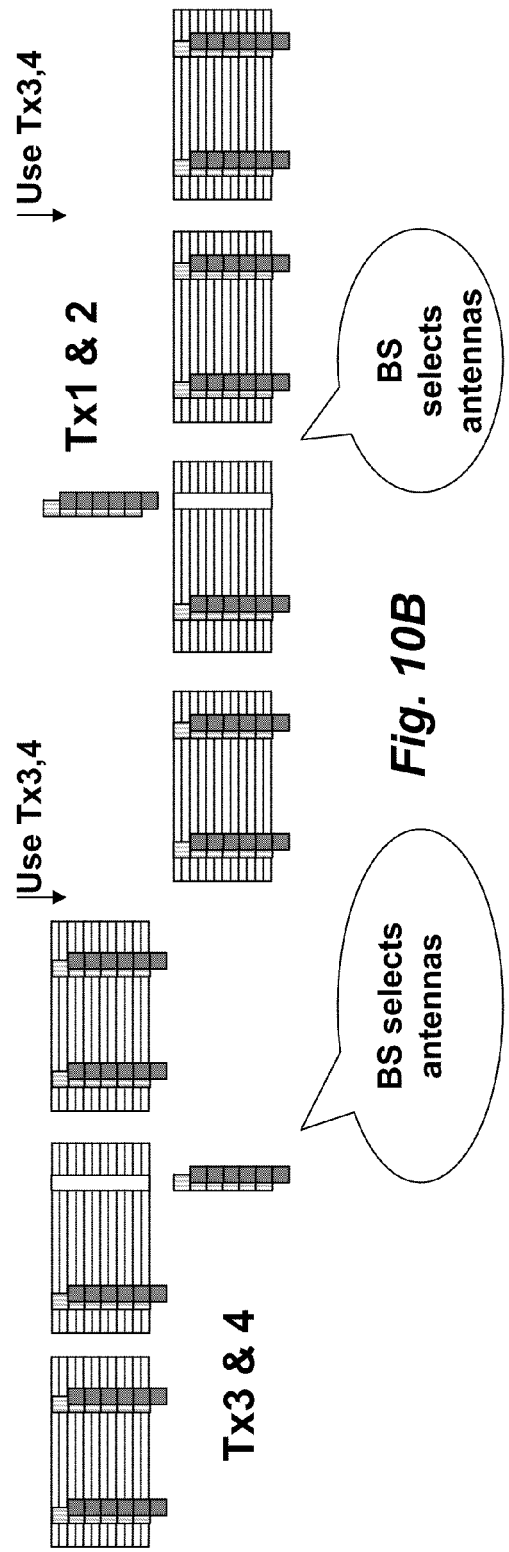

FIGS. 10A-10B show antenna set selection by using periodic CDM data modulation signals. In this case, the two pilots 1001-1002 transmitted concurrently are orthogonal to each other. Similar schemes are possible when the UE switches between TTIs, and for on demand (adaptive) antenna selection.

Antenna Training for One RF Chain and Four Transmit Antennas

Figure 11:
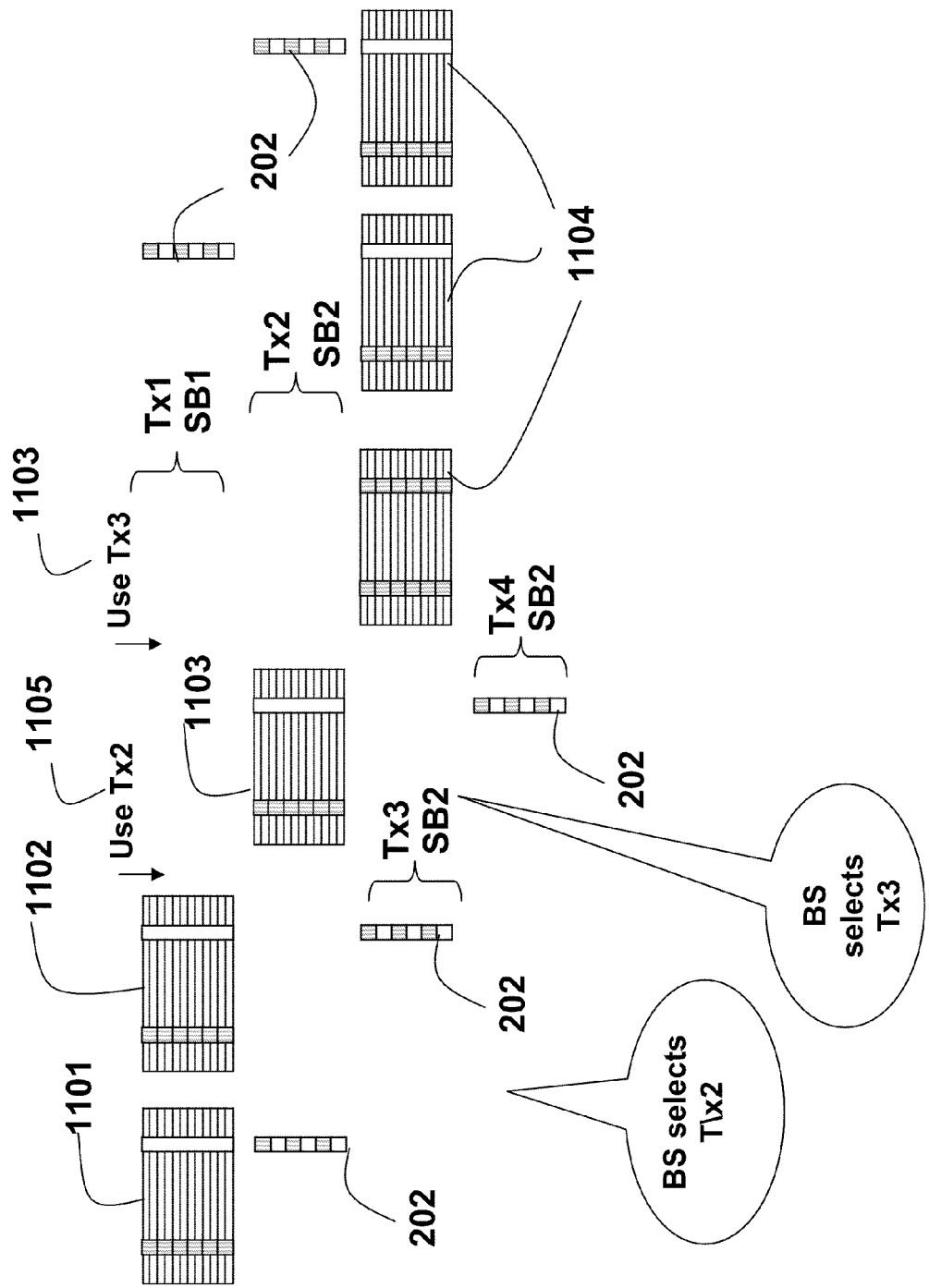

An embodiment for one RF chain and four antennas as shown in FIG. 11. The UE transmits the training information for four antennas, such that only one transmit antenna is active at any one time. We describe three options, although other generalizations and combinations are also possible.

As shown in FIG. 11, the UE sends a data packet in the first TTI 1101 from Tx1, and uses SB2 to send the AS signal 202 for Tx2. Then, the BS can determine which of the antennas Tx1 and Tx2 is better, and feeds its decision, e.g., use Tx2 1105, back to the UE. This feedback is received by the UE after the third TTI. In the meantime, the UE retransmits the second data packet in the second TTI 1102 from Tx1, and uses SB2 of the RB to send the AS signal for Tx3. Then, the transmitter switches to Tx2, as earlier indicated by the BS, and transmits the third data packet in TTI 1103 using Tx2. In the same TTI, the UE uses the SB2 to send the antenna selection signals for the last remaining antenna Tx4. Then, the BS determines, for example, that Tx3 is the optimal of all four antennas, and indicates to UE to transmit using Tx3. The UE then transmits the data packets 1104 using Tx3 1103. A similar mechanism can be described for the 1 ms TTI with 14 LBs in which 2 LBs carry reference signals.

Note that the BS updates its selection decision and feeds the decision back while estimating the channels for the different antennas. In one embodiment, the BS only feed back its final decision, without incremental selection updates. In this case, the feedback to use Tx2 is absent, and the UE transmits the third TTI using Tx1.

Figure 12:
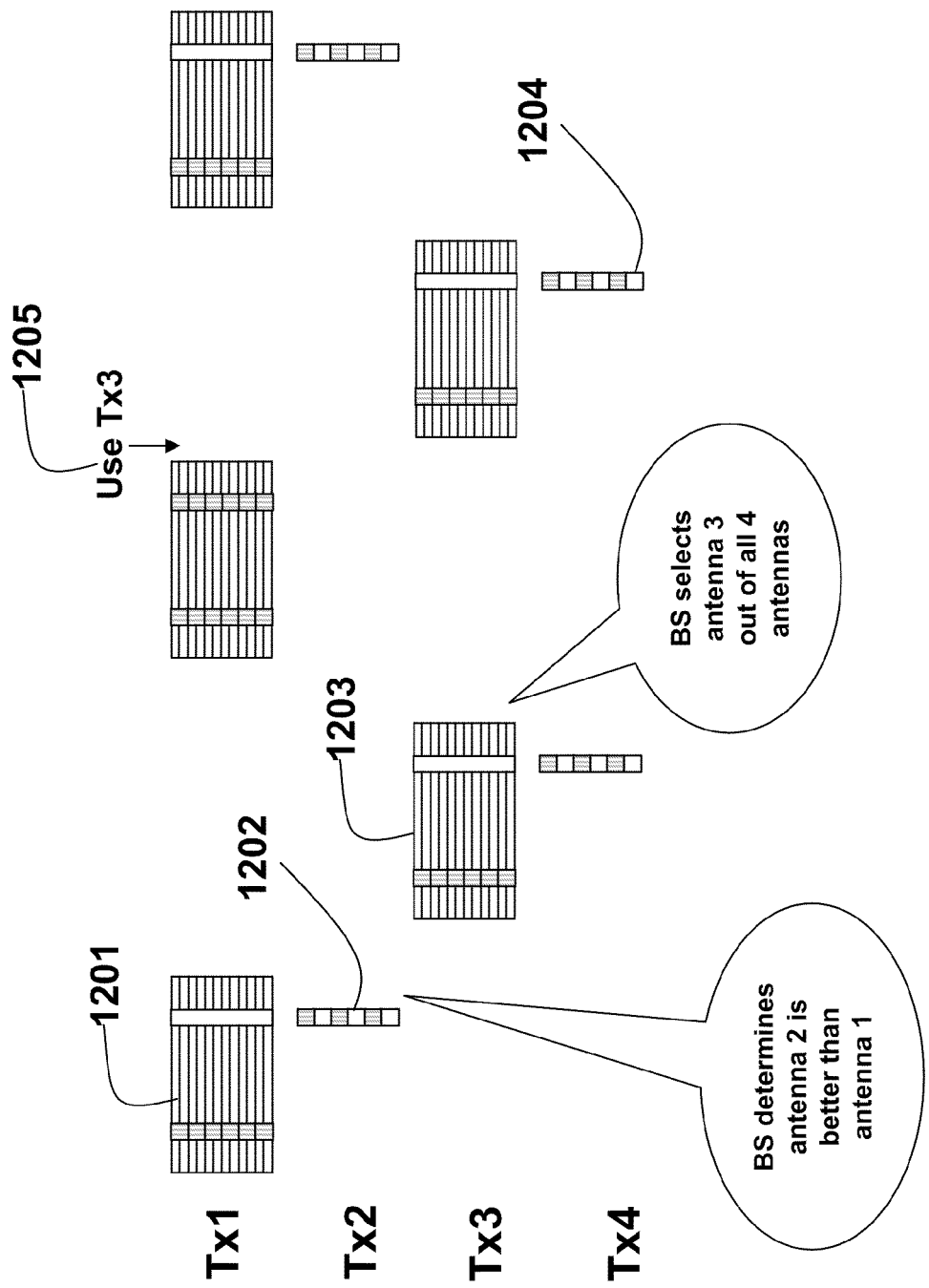

FIG. 12 shows another option to speed up the selection process. This option uses a combination of selecting within a TTI and selecting between TTIs. The UE transmits a data packet using antenna Tx1 in the first TTI 1201, and uses SB2 to send the AS signal 1202 from antenna Tx2. Then, the UE switches to antenna Tx3 to transmit the data packet in the second TTI 1203, and sends the AS signal 1204 for antenna Tx 4 in SB2.

Then, the BS can determine and compare the channel estimates from all the four transmit antennas and feeds back its selection decision to the UE, e.g., Tx3 1205. The UE continues to transmit data packets from antenna Tx1, while waiting for the selection decision, and switches to antenna Tx3 thereafter.

Figure 13:
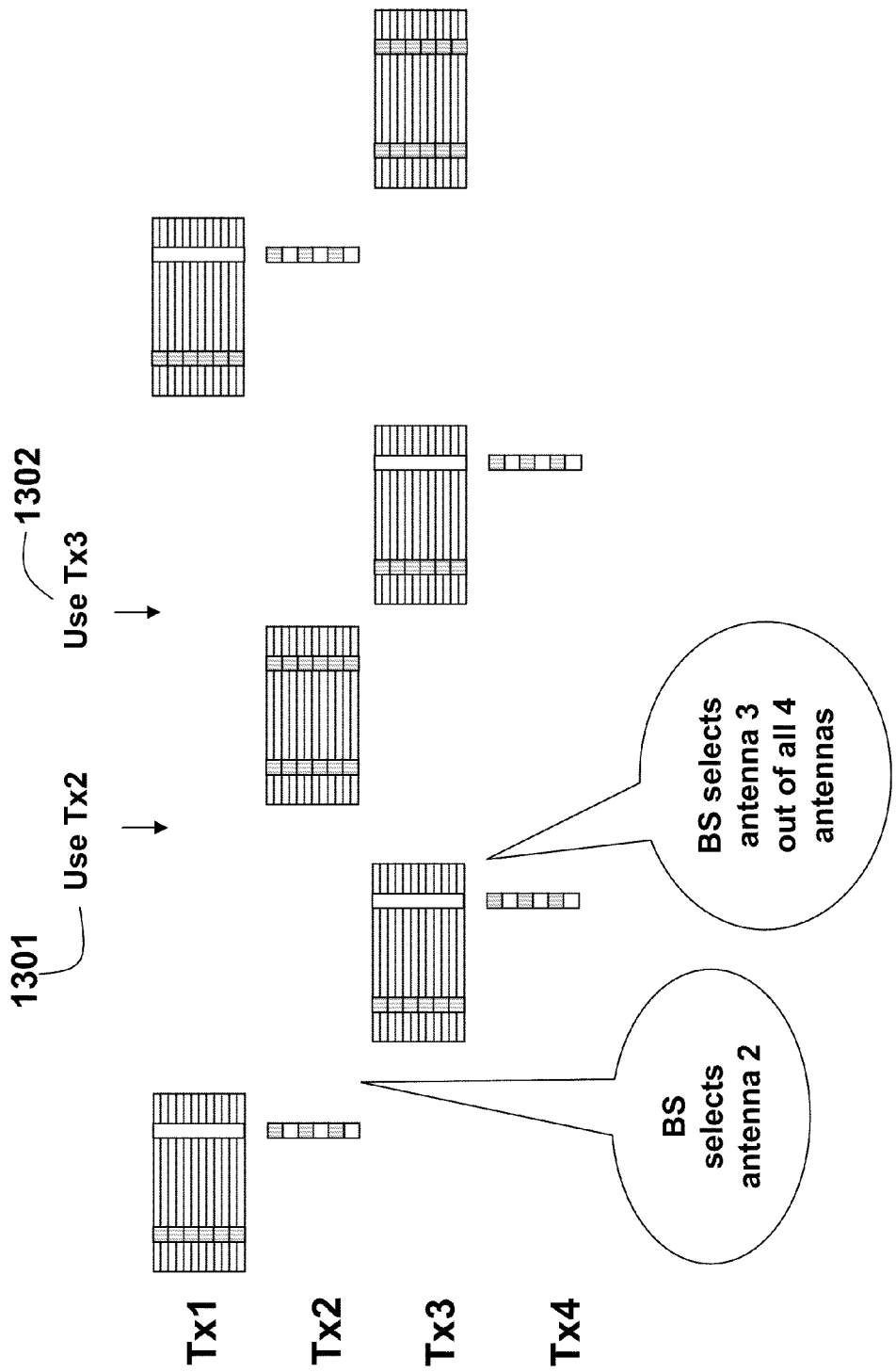

Alternatively as shown in FIG. 13, the BS send an incremental update when the BS can estimate only a set of the channels of the multiple available antennas. The BS compares the channel estimates for antennas Tx1 and Tx2 after the first TTI, and sends the selection decision 1301 back to the UE. For example, the BS selects Tx2 1301. This decision is received by the UE after the second TTI. In the second TTI, the UE, as before, uses antenna Tx3 to transmit its data packet and antenna Tx4 for the AS signal. However, in the third TTI, after receiving the BSs selection decision, the UE switches to Tx2 to transmit the data packet. As before, the BS can compare all the four antennas after the second TTI, and send it selection decision, e.g., Tx3 1302, back to the UE. The UE switches to Tx3 after the third TTI.

Using AS Packets

Stand Alone AS Packets

Figure 14:
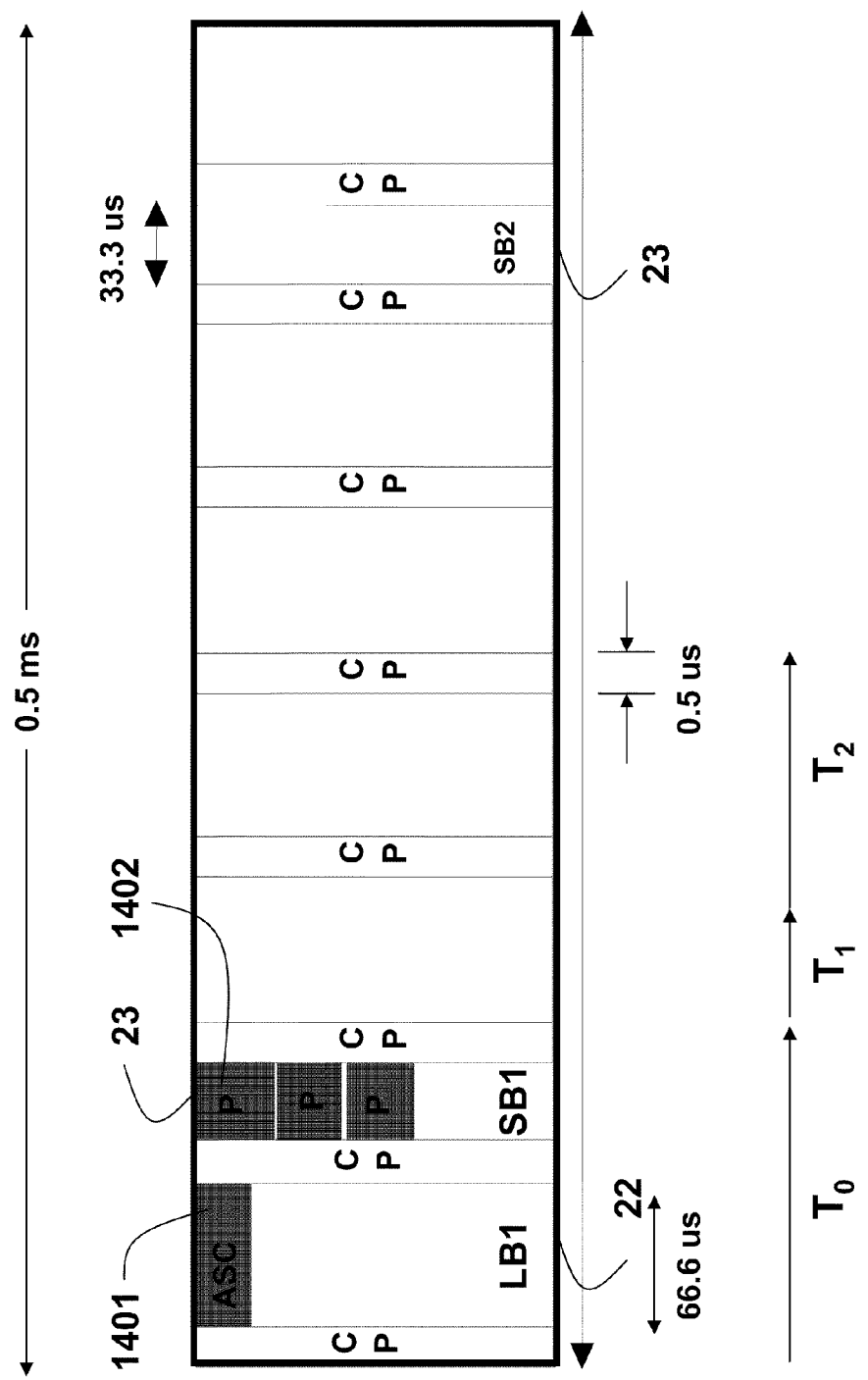
FIGS. 14 and 15 are block diagrams of antenna selection packets according to an embodiment of the invention.

In addition to the embodiments described above, the antenna selection process can also use an antenna selection (AS) packet 1400 as shown in FIG. 14. The AS packet embeds antenna selection control (ASC) information 1401 in, e.g., the first long block (LB1) and the DM pilot (P) signal 1402 in the first short block SB1 in case of a slot with 2 SBs, or in LB4 in case of a TTI with 14 LBs. This process is very suitable for traffic in bursts, as selection can be done just before a transmission burst. The ASC information 1401 can indicate which subsets of antennas are being used by the UE to transmit the signals. Thus, the BS can directly associate its channel estimate with a specific antenna. In addition, the ASC information can also indicate an antenna selection request by the UE, and that pilot tone in the second short block SB2 should be used for training by the BS.

As shown in FIG. 14, the BS does not need to receive the pilot tones before selecting an antenna. The BS can select immediately after receiving the first two OFDM symbols of the uplink TTI. This involves the following steps and timing delays. The BS receives the first and second OFDM symbols of the UL TTI from the UE and performs channel estimation and antenna selection with delay $T_0$. There is negligible round trip propagation delay $T_1$ if the distance from the BS to the UE is less than 10 Km. The first long and short blocks of the DL TTI are received by the UE, and the UE then switches to the selected antenna with delay $T_2$.

Piggybacking AS Training

Figure 15:
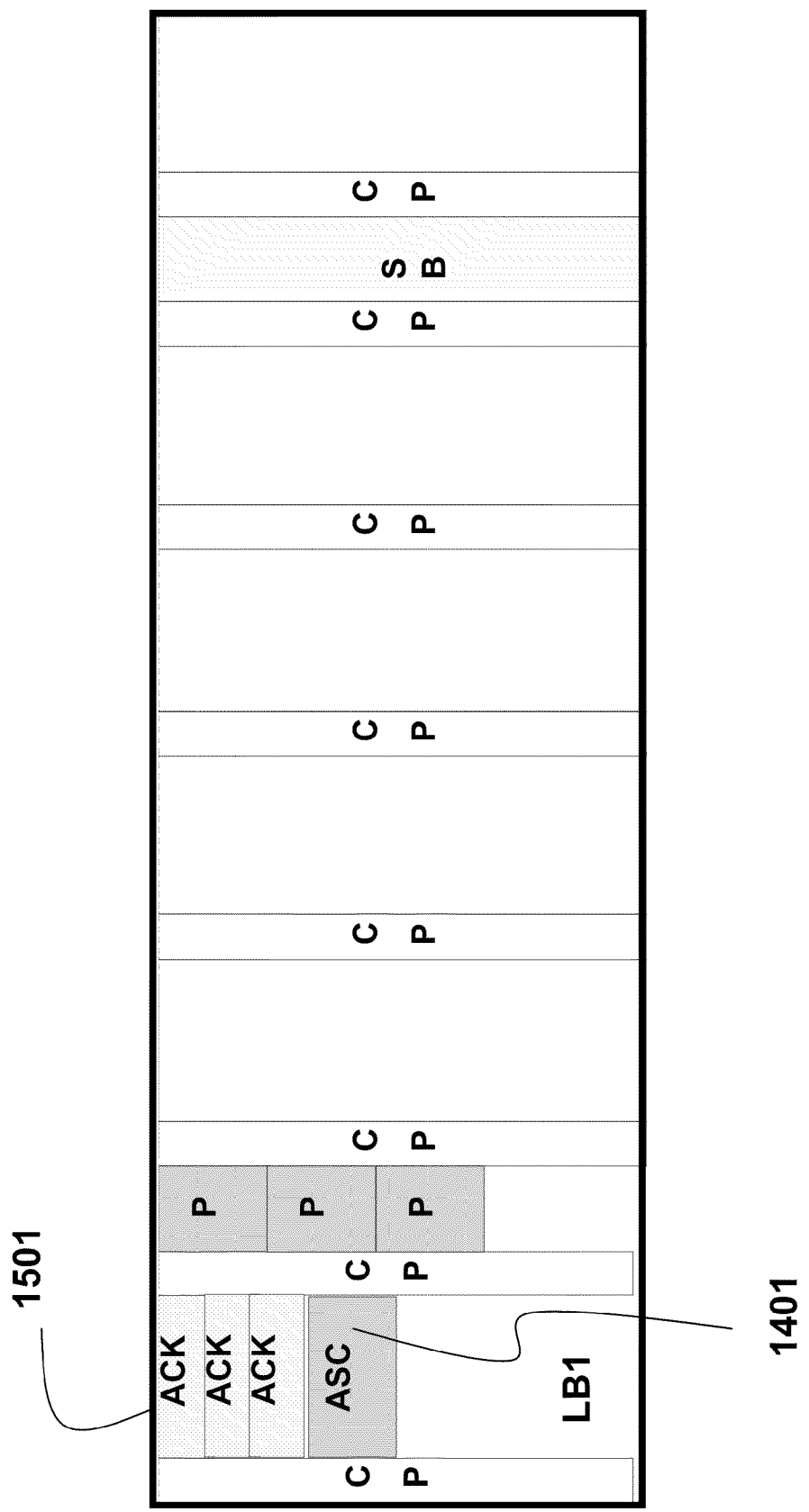

Alternatively as shown in FIG. 15, the UE can use control packets, such as packets with ACK or NACK 1501 in LB1, for antenna selection. This type of packet is sent on the uplink after the UE receives a packet from the BS, even when the UE has no other uplink packets to transmit to the BS. To decrease the overhead of antenna selection, the ACS field 1401 can be sent with some packets on otherwise unselected antennas. Therefore, this scheme requires no additional packets to be sent. The AS information can be piggybacked either in a periodic manner or adaptively, as described above. Furthermore, either the UE or the BS can initiate this process.

Antenna Selection Methods

Figure 16:
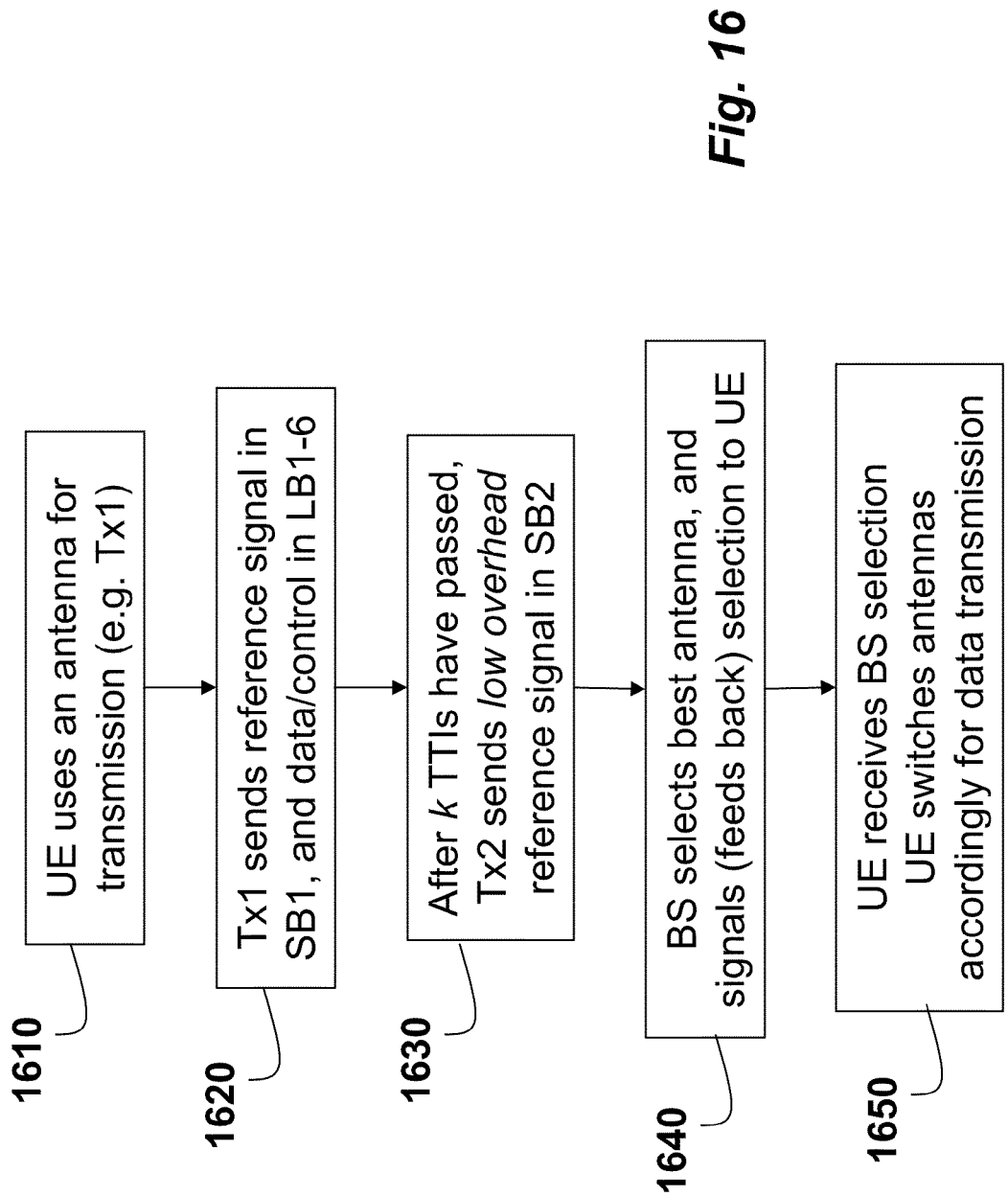
FIG. 16 is a flow diagram of an antenna selection method according to an embodiment of the invention.

FIG. 16 shows an antenna selection method according to an embodiment of the invention. A first antenna is selected 1610 for transmitting signals from the UE to the BS, e.g., the selected antenna Tx1 is the last used antenna. It is assumed that the previous selection is known to the UE and the BS. The UE transmits 1620 a data packet to the BS via the selected antenna (Tx1) during a TTI. The data (or control information) are carried in long blocks of the data packet.

The UE also transmits 1630 an AS signal, as described above, using an unselected antenna, e.g., Tx2. The sending of the AS signal can be periodic every k TTIs, or on demand. The AS signal is carried in a short block of the packet, or a subsequent data packet. The AS signal can be a FDM or CDM signal. As described herein, the AS signal can even be a low overhead signal. If the signal is a FDM signals, then low overhead implies a smaller number of signal sub-carriers. For CDM signals, low overhead signals have reduced power.

In response to receiving the data packet and the AS signal, the BS estimates the channel and selects an antenna, and transmits the selection to the UE in step 1640. In the case of CDM signals, the BS can also reassign the carrier frequencies of the resource blocks used by the UE. Then, after receiving 1650 the selection, and perhaps the RB assignment, the UE switches to the selected antenna for transmitting sequent packets.

If the antenna selection is on demand, the selection process can be initiated by either the UE or BS based on the SINR, MCS, or HARQ history.

Figure 17:
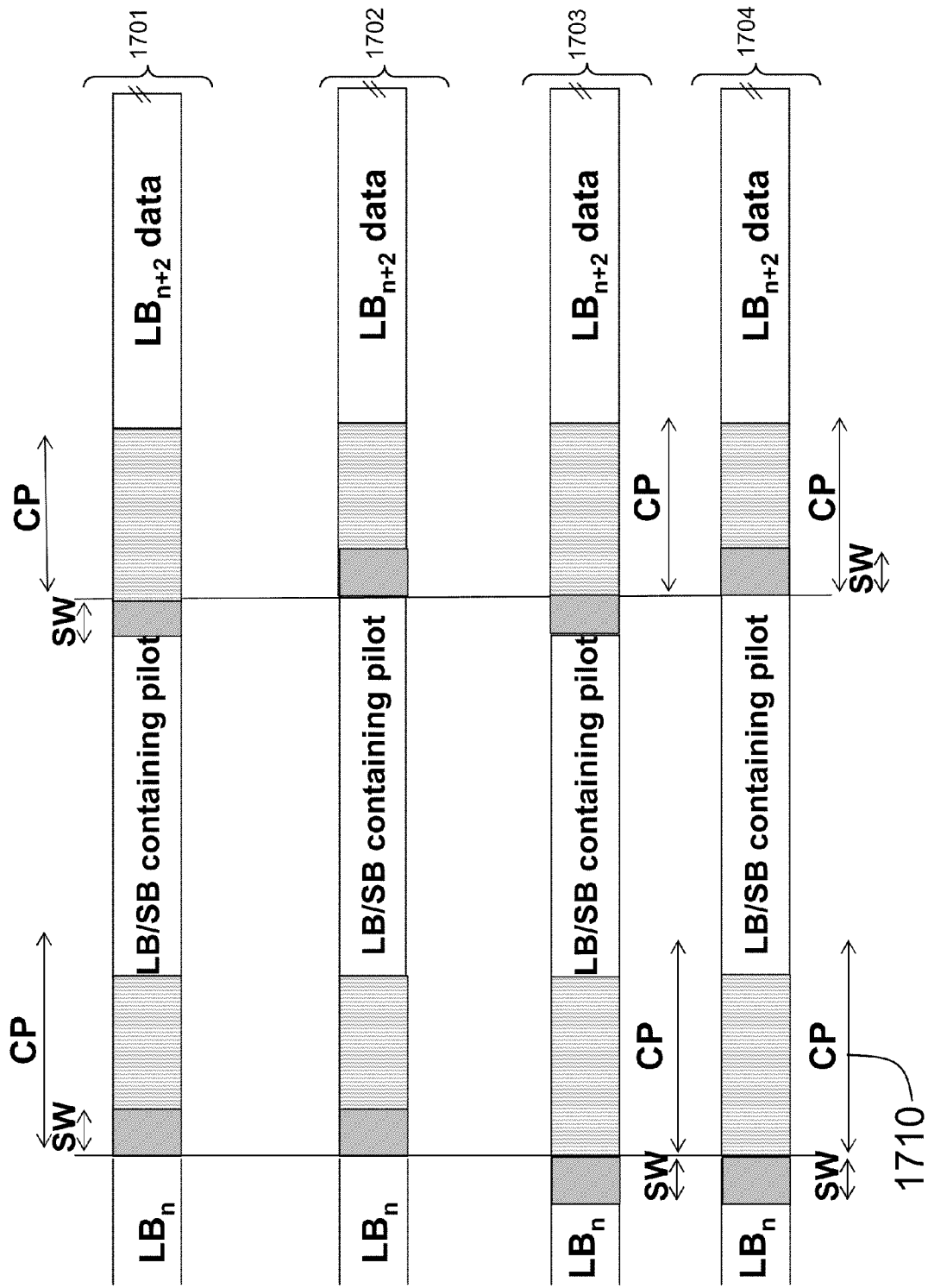
FIG. 17 is a block diagram of four ways that antennas can be switched after they have been selected.

FIG. 17 shows four ways (1701-1704) that antennas can be switched (SW) after they have been selected. The time required to switch antennas can be measured in terms of nanoseconds, e.g., 10 to 100 nanoseconds depending on the exact implementation. This is orders of magnitude shorter than the length of the symbol, e.g., 10 ms.

Therefore, in one embodiment of the invention, the antennas are switched substantially between the symbols. That is, the switching can take place at the end of the block of the previous symbol, or at the beginning of the CP of the next symbol.

The four ways include: switching entirely within an LB/SB used to send signals, and use CP 1710 and LB or SB data part for switching-1701; switching using CP of LB/SB used to send pilot tones and CP of adjacent LB-1702; switching using CP of LB/SB used to send pilot tones and CP of adjacent LB-1703; and switching using CP of adjacent LBs and not using the CP of the LB/SB used to send pilot tones-1704. Of these four methods, the first method, in which the LB/SB that contains pilot tones for transmission, is used for the switching times leads to the least loss in performance because data LBs are not affected.

Reduced Antenna Sounding RS Overhead

It is also possible to reduce the overhead of antenna selection by reducing the frequency at which the AS RS is transmitted. In addition, the sounding reference signal can be transmitted even when no data are transmitted. Furthermore, the base station can transmit its decision about which antenna the UE should use any time, including instances when the UE has not transmitted the sounding reference signal from the unselected antenna subset.

Figure 18:
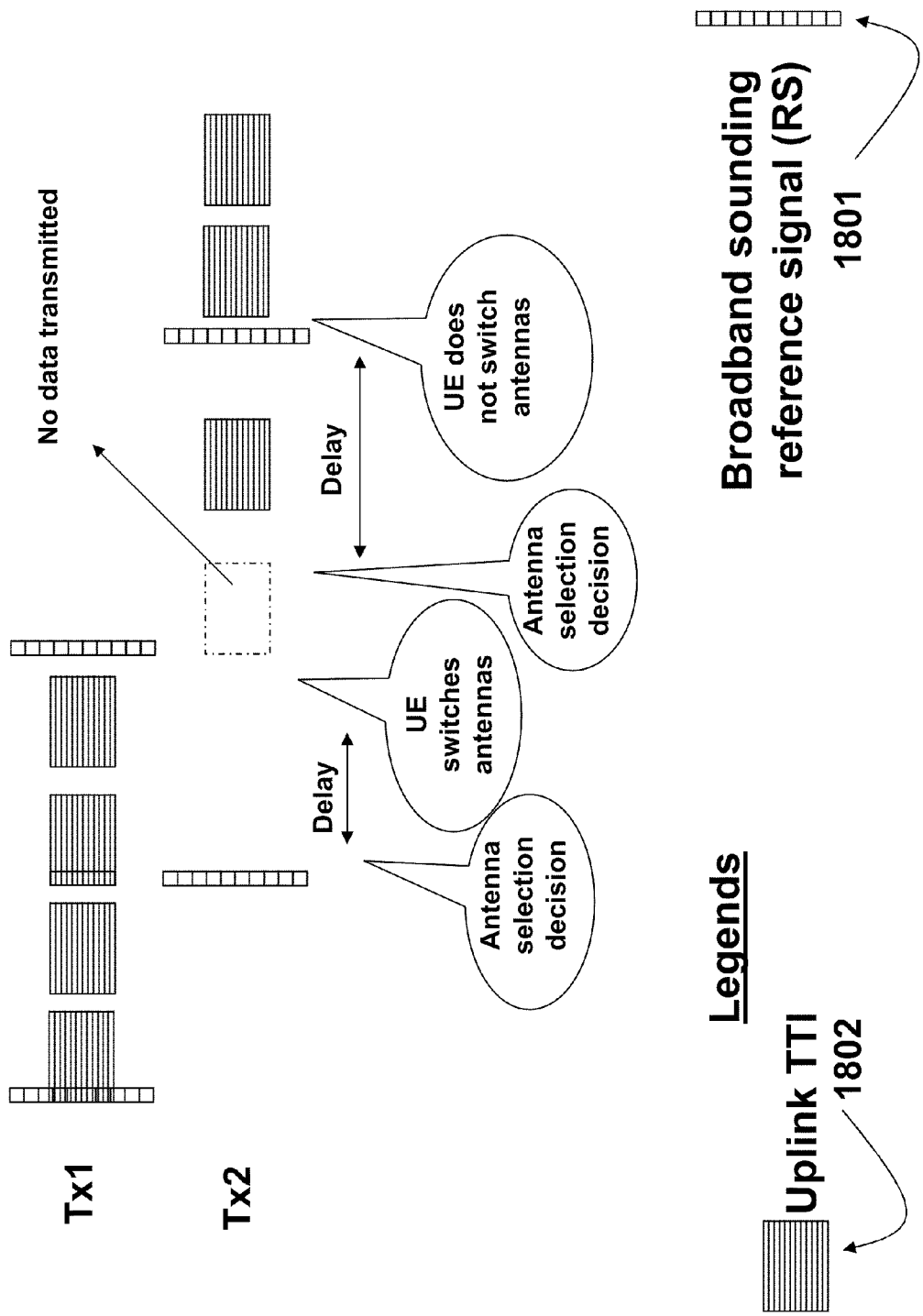
FIG. 18 is a block diagram of transmitting a sounding reference signal alternatively by different antennas according to an embodiment of the invention.

As shown in FIG. 18, the broadband sounding RS 1801 is transmitted alternatively from the two antennas. Note that the broadband SRS may be transmitted even when the UE does not transmit data. The base station estimates the channels for the two antennas and performs resource block and antenna scheduling. For example, the sounding RS period is two TTI 1802, and the UE starts transmitting from TTI #1. Then, the sounding RS of TTI # 1, 5, 9, . . . is transmitted from the first antenna and the sounding RS of TTI # 3, 7 11, . . . is transmitted from the second antenna.

One embodiment of the invention described below reduces the antenna sounding overhead when the sounding RS is used as AS RS.

Figure 19:
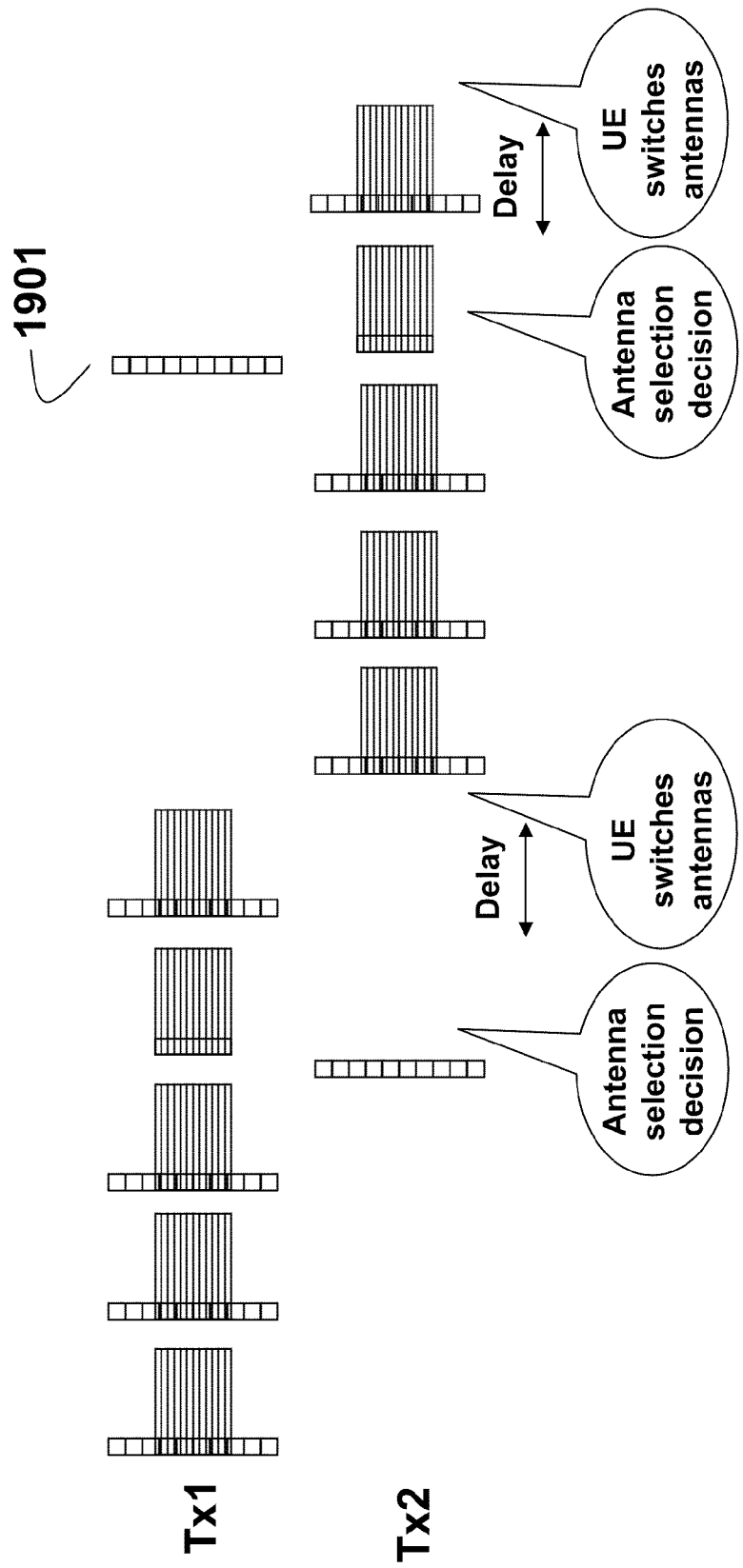
FIG. 19 is a block diagram of transmitting a sounding reference signal from unselected antennas less frequently than from selected antennas according to an embodiment of the invention.

As shown in FIG. 19, the sounding RS 1901 is again transmitted periodically. However, we now distinguish between the selected antenna that has most recently been selected by the eNodeB for data transmission and the other unselected antenna. Now, only one in every k sounding RSs is transmitted from the unselected antenna and the rest RSs are transmitted from the selected antenna, where k is greater than 1, for example five, ten or fifteen. The optimal parameter value for k depends on the UE speed, the Doppler spread of the uplink wireless channel, scheduling constraints of the eNodeB, interference environment, etc. As before, the eNodeB performs resource block assignment and decides which antenna the UE should use for data transmission. The parameter k is known to the eNodeB and the UE a priori.

The advantage of this scheme is that the eNodeB can estimate the channel for the selected antenna more frequently. This is often the optimal antenna when the UE is moving slowly, or not at all. In both of the above mechanisms, the eNodeB can know a priori when the unselected antenna transmits the sounding RS.

Figure 20:
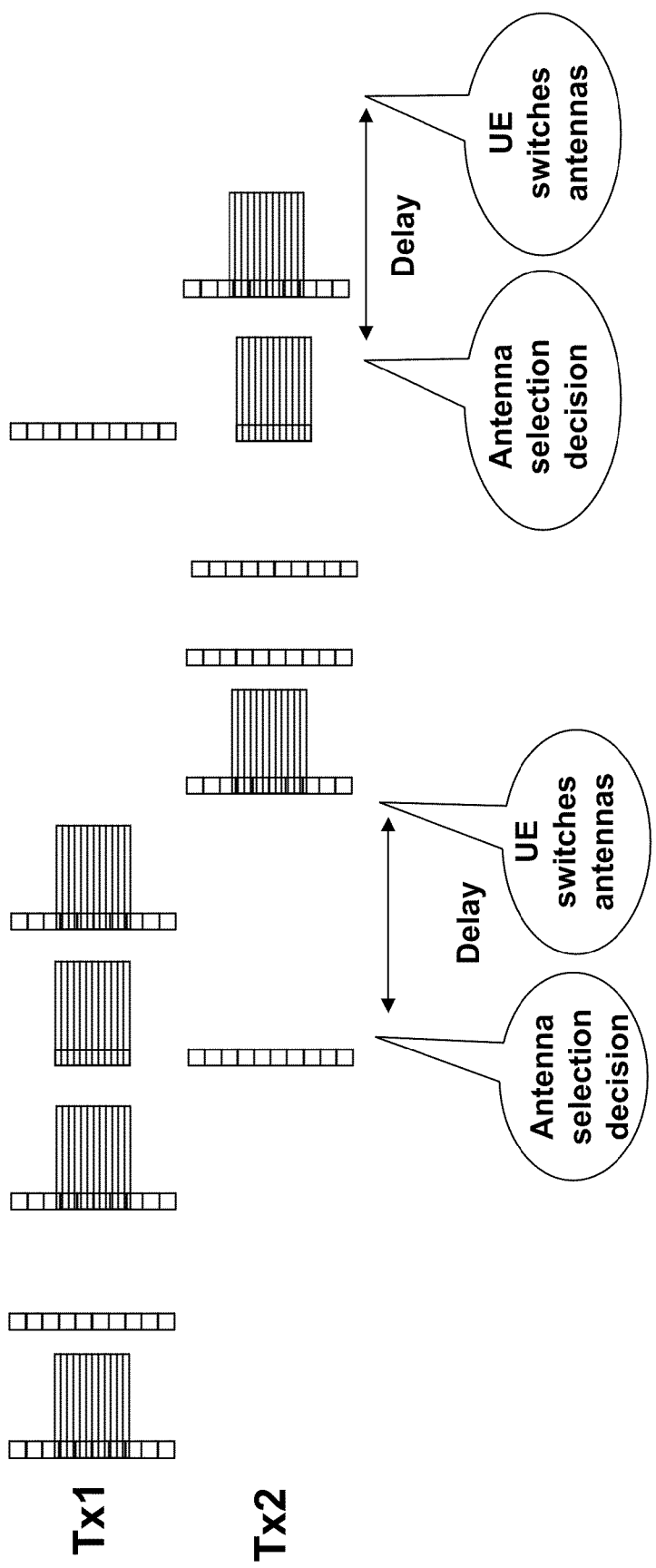
FIG. 20 is a block diagram of transmitting a sounding reference signal from unselected antennas less frequently even when no data are transmitted from the selected antenna according to an embodiment of the invention.

As shown in FIG. 20, the sounding RS can be transmitted by the UE even when the UE does not have data to transmit. A reduction in the AS sounding overhead when the DM RS is used for AS can be achieved in a similar manner.

Simulation

In the following, we describe various adaptive antenna selection schemes, and system-level simulation results with and without frequency domain scheduling over different sounding RS usage parameters.

The simulation parameters are given in Table 1.

TABLE 1

| | |
|---|---|
| System bandwidth | 10 MHz |
| TTI duration | 1 ms |
| Number of carriers per RB | 12 |
| Sounding RS location | $1^{st}$ long block |
| Number of LBs per TTI | 14 |
| Number of UEs per BS (cell) | 25 |
| Channel model | 6-ray typical urban |
| UE speed | 3 kmph |
| Number of transmit (UE) antennas | 2 |
| Number of transmit RF chains | 1 |

TABLE 1-continued

| | |
|---|---|
| Number of receiver (eNodeB) antennas | 2 |
| Feedback delay | 1 TTI |
| Normalized distance between transmit antennas | 0.5 m |
| Variance of angle of departure | 58° |
| Spatial correlation of eNodeB (receive) antennas | Uncorrelated |
| Number of contiguous RBs assigned to a UE | 2 |
| Scheduling algorithm | Frequency-domain 2. Fixed RB assignment |

Simulation Results

Alternately Sounding the Two Antennas

We first consider the case in which the sounding RS is transmitted from the two antennas in an alternating manner as described above. The transmission interval of the sounding RS is set to either 2 ms or 10 ms.

The gains of adaptive antenna selection experienced by the user over single antenna selection are summarized in Table 2. The SNR gain experienced by UE with adaptive antenna selection capability over a UE with single transmit antenna for a two TTI sounding interval.

TABLE 2

| 2 TTI sounding interval | | |
|---|---|---|
| SNR CDF point | With frequency-domain scheduling | Without frequency-domain scheduling |
| 1% | 3.2 dB | 3.8 dB |
| 10% | 2 dB | 2.6 dB |

The gains of adaptive antenna selection experienced by the user equipment over single antenna selection are summarized in Table 3. In Table 3, the SNR gain experienced by a UE with adaptive antenna selection capability over a UE with a single transmit antenna for the TTI sounding interval.

TABLE 3

| 10 TTI Sounding Interval | | |
|---|---|---|
| SNR CDF point | With frequency-domain scheduling | Without frequency-domain scheduling |
| 1% | 2.4 dB | 3.0 dB |
| 10% | 1.6 dB | 2.3 dB |

In all cases, we see that the performance of the UE with adaptive antenna switching capability, measured in terms of the SNR its link experiences, significantly improves.

Reduced Overhead Antenna Sounding

We now consider the case in which the sounding RS from the selected antenna is transmitted less often from the unselected antenna. The transmission interval of the sounding RS is 2 ms. Sending the sounding RS from the unselected antenna less frequently, e.g., in only one out of five instances, has negligible loss in performance. Even adaptive antenna selection based on the other more extreme cases, in which the sounding RS is sent from the unselected antenna in one out of ten, or one out of fifteen instances, still results in significant performance gains.

EFFECT OF THE INVENTION

The embodiments of the invention provide for antenna selection in the uplink from user equipment to a base station in a MIMO network, where the number of RF chains in the UE is less than the number of antennas. The invention also provides means for selecting antennas adaptively.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for antenna selection (AS) in a wireless communication network, the network comprising user equipment (UE), wherein the UE comprises a plurality of subsets of antennas including a selected subset of antennas and an unselected subset of antennas, and wherein the UE is configured to transmit only from a subset of antennas at a time, comprising:
   transmitting user data from the selected subset of antennas within a set of subframes;
   transmitting a sounding reference signal (SRS) from the unselected subset of antennas within at least one subframe in the set of subframes to enable antenna selection for user data transmission;
   switching from the selected subset of antennas to the unselected subset of antennas for the transmitting the SRS; and
   switching back, after the transmitting the SRS, from the unselected subset of antennas to the selected subset of antennas for the transmitting the user data.

2. The method of claim 1, further comprising:
   receiving, in response to the transmitting the user data and the SRS, information identifying an optimal subset of antennas from the selected subset of antennas and the unselected subset of antennas.

3. The method of claim 2, further comprising:
   switching between the selected and the unselected subset of antennas based on the information.

4. The method of claim 2, wherein the information is determined by a base station based on the user data and the SRS.

5. The method of claim 1, wherein the SRS is transmitted periodically.

6. The method of claim , wherein the SRS is transmitted when demanded by a base station.

7. The method of claim 1, further comprising:
   switching between the selected subset of antennas and the unselected subset of antennas during a plurality of contiguous single-carrier orthogonal frequency division multiplexed access (SC-OFDMA) symbols in the subframe.

8. The method of claim 1, wherein the switching from tile selected subset of antennas to the unselected subset of antennas is after a part of the user data is transmitted.

9. The method of claim 1, further comprising:
   switching between the selected subset of antennas and the unselected subset of antennas during a data symbol of the user data.

10. The method of claim 1, further comprising:
    switching between the selected subset of antennas and the unselected subset of antennas during a cyclic prefixes.

11. The method of claim 1, wherein the SRS occupies more resource blocks than the user data.

12. A user equipment (UE), comprising:
    a selected subset of antennas configured for transmitting user data within a set of subframes;
    an unselected subset of antennas configured for transmitting a sounding reference signal (SRS) within at least one subframe in the set of subframes;
    means for switching from the selected subset of antennas to the unselected subset of antennas for the transmitting the SRS; and
    means for switching back, after the transmitting the SRS, from the unselected subset of antennas to the selected subset of antennas for the transmitting the user data.

13. The UE of claim 12, further comprising:
    receiving module configured to receive, in response to the transmitting the user data and the SRS, information identifying an optimal subset of antennas from the selected subset of antennas and the unselected subset of antennas.

14. The method of claim 13, further comprising:
    a means for switching between the selected subset of antennas and the unselected subset of antennas based on the information.

15. A wireless communication network, the network comprising user equipment (UE), wherein the UE comprises a plurality of subsets of antennas including a selected subset of antennas and an unselected subset of antennas such that UE is adapted for antenna selection (AS), and wherein the UE is configured to transmit only from a subset of antennas at a time, comprising:
    means for transmitting user data from the selected subset of antennas within a set of subframes; and
    means for transmitting a sounding reference signal (SRS) from the unselected subset of antennas within at least one subframe in the set of subframes to enable antenna selection for user data transmission; and
    means for switching between the selected subset of antennas and the unselected subset of antennas during a cyclic prefixes.

16. The method of claim 15, further comprising:
    means for receiving, in response to the transmitting the user data and the SRS, information identifying an optimal subset of antennas from the selected subset of antennas and the unselected subset of antennas.

17. The method of claim 16, further comprising:
    means for switching between the selected and the unselected subset of antennas based on the information.

18. The network of claim 16, further comprising:
    means for selecting the optimal subset of antennas from the selected and the unselected subset of antennas based on the information.

19. A user equipment (UE), comprising:
    a selected subset of antennas configured for transmitting user data within a set of subframes;
    an unselected subset of antennas configured for transmitting a sounding reference signal (SRS) within at least one subframe in the set of sublimes; and
    means for switching between the selected subset of antennas and the unselected subset of antennas during a plurality of contiguous single-carrier orthogonal frequency division multiplexed access (SC-OFDMA) symbols in the subframe.

* * * * *